(12) United States Patent
Popeil et al.

(10) Patent No.: US 11,045,047 B2
(45) Date of Patent: Jun. 29, 2021

(54) VARIABLE CAPACITY OVEN

(71) Applicant: Ron's Enterprises, Inc., Beverly Hills, CA (US)

(72) Inventors: Ronald M. Popeil, Beverly Hills, CA (US); Alan L. Backus, Los Angeles, CA (US)

(*) Notice: Subject to any disclaimer, the term of this patent is extended or adjusted under 35 U.S.C. 154(b) by 0 days.

(21) Appl. No.: 16/809,845

(22) Filed: Mar. 5, 2020

(65) Prior Publication Data

US 2020/0214500 A1    Jul. 9, 2020

Related U.S. Application Data

(63) Continuation-in-part of application No. 16/189,650, filed on Nov. 13, 2018, which is a
(Continued)

(51) Int. Cl.
*A47J 37/06* (2006.01)
*F24C 15/02* (2006.01)
*F24C 15/00* (2006.01)
*F24C 15/08* (2006.01)
*F24C 15/16* (2006.01)
*F24C 7/04* (2021.01)
(Continued)

(52) U.S. Cl.
CPC ....... *A47J 37/0664* (2013.01); *A47J 37/0641* (2013.01); *A47J 37/0694* (2013.01); *F24C 7/046* (2013.01); *F24C 7/067* (2013.01); *F24C 15/004* (2013.01); *F24C 15/023* (2013.01); *F24C 15/08* (2013.01); *F24C 15/16* (2013.01); *F24C 15/322* (2013.01); *H05B 3/40* (2013.01)

(58) Field of Classification Search
CPC ................ A47J 37/0664; A47J 37/0641; A47J 37/0694; A47J 37/0623; A23L 13/50; A23L 13/57; A23L 5/17; A23L 5/15
USPC ......... 99/324, 325, 330, 331, 332, 337, 338, 99/339, 340, 357, 369, 419, 474, 476; 219/392, 400, 413, 490, 446, 476, 494
See application file for complete search history.

(56) References Cited

U.S. PATENT DOCUMENTS 1,986,088 A    1/1935   Wild
2,274,325 A    2/1942   Ford
(Continued)

FOREIGN PATENT DOCUMENTS

DE    2412835    9/1975
DE    7442343    7/1976
(Continued)

*Primary Examiner* — Phuong T Nguyen
(74) *Attorney, Agent, or Firm* — Ulmer & Berne LLP

(57) ABSTRACT

A cooking enclosure is configured to hold food being cooked. The enclosure includes a surrounding, generally vertical, sidewall, projecting upward from a base. The base includes a floor bridging a bottom of enclosure, and the enclosure is capped by a vertically moving ceiling. The vertical moving ceiling secures a cooking heat source which is in thermal communication with the enclosure interior. The moving ceiling is configured to move up and down within the sidewall to vary, up and down, a volume of the cooking enclosure. The cooking enclosure is configured to have both a smaller cooking enclosure volume, suitable for quickly cooking small foods, and larger cooking enclosure volume necessary to cook larger foods.

14 Claims, 31 Drawing Sheets

Related U.S. Application Data continuation-in-part of application No. 15/862,175, filed on Jan. 4, 2018, application No. 16/809,845, which is a continuation-in-part of application No. 15/862,175, filed on Jan. 4, 2018.

(60) Provisional application No. 62/715,897, filed on Aug. 8, 2018, provisional application No. 62/584,374, filed on Nov. 10, 2017, provisional application No. 62/584,374, filed on Nov. 10, 2017.

(51) Int. Cl.
*F24C 7/06* (2006.01)
*H05B 3/40* (2006.01)
*F24C 15/32* (2006.01)

(56) References Cited

U.S. PATENT DOCUMENTS

| | | |
|---|---|---|
| D133,344 S | 8/1942 | Austin |
| 2,408,331 A | 9/1946 | Mills |
| 2,523,796 A | 9/1950 | Weeks |
| 2,654,824 A | 10/1953 | Schroeder |
| 2,708,709 A | 5/1955 | Pearce |
| 2,848,592 A | 8/1958 | Mergen |
| 2,864,932 A | 12/1958 | Forrer |
| 2,893,307 A | 7/1959 | Rodriguez |
| 2,898,437 A | 8/1959 | McFarland |
| 2,949,524 A | 8/1960 | Scarioni |
| 2,957,067 A | 10/1960 | Scofield |
| 3,003,409 A | 10/1961 | Mills |
| 3,074,179 A | 1/1963 | Stelling, Jr. |
| 3,077,530 A | 2/1963 | Chase et al. |
| 3,114,363 A | 12/1963 | Koltun |
| 3,168,642 A | 2/1965 | Savio |
| 3,239,651 A | 3/1966 | Silberman et al. |
| 3,266,559 A | 8/1966 | Osborne et al. |
| 3,281,575 A | 10/1966 | Ferguson, Jr. |
| D212,820 S | 11/1968 | Benes |
| 3,414,708 A | 12/1968 | Maier |
| 3,514,576 A | 5/1970 | Hilton et al. |
| 3,529,556 A | 9/1970 | Barnes |
| 3,529,582 A | 9/1970 | Hurko et al. |
| 3,586,516 A | 6/1971 | Terc |
| 3,692,968 A | 9/1972 | Yasuoka |
| 3,759,241 A | 9/1973 | Berkhoudt |
| 3,770,408 A | 11/1973 | McCully |
| 3,817,346 A | 6/1974 | Wehmeyer |
| 3,820,524 A | 6/1974 | Buckell |
| 3,821,454 A | 6/1974 | Lobel |
| 3,828,760 A | 8/1974 | Farber et al. |
| 3,851,639 A | 12/1974 | Beddoe |
| 3,882,767 A | 5/1975 | Oyler et al. |
| 3,883,671 A | 5/1975 | Shatila |
| 3,884,213 A | 5/1975 | Smith |
| 3,926,106 A | 12/1975 | Deusing et al. |
| 3,938,494 A * | 2/1976 | Clark .............. A47J 37/0713 126/41 R |
| 3,962,962 A | 6/1976 | Anderson |
| 3,978,843 A | 9/1976 | Durth |
| 4,010,341 A | 3/1977 | Ishammar |
| 4,010,349 A | 3/1977 | Lee |
| 4,039,776 A | 8/1977 | Roderick |
| 4,051,347 A | 9/1977 | Rohrl et al. |
| 4,071,738 A | 1/1978 | Jenn et al. |
| 4,071,739 A | 1/1978 | Jenn et al. |
| 4,092,390 A | 5/1978 | Mulvany, Jr. |
| 4,112,916 A | 9/1978 | Guibert |
| 4,132,216 A | 1/1979 | Guibert |
| 4,133,336 A | 1/1979 | Smith |
| 4,154,861 A | 5/1979 | Smith |
| 4,162,141 A | 7/1979 | West |
| 4,173,215 A | 11/1979 | Bureau et al. |
| 4,188,520 A | 2/1980 | Dills |
| 4,208,572 A | 6/1980 | Melgaard |
| 4,210,072 A | 7/1980 | Pedrini |
| 4,226,178 A | 10/1980 | Geissler et al. |
| 4,286,456 A | 9/1981 | Sisti et al. |
| 4,295,034 A | 10/1981 | Assmann |
| 4,327,279 A | 4/1982 | Guibert |
| 4,332,992 A | 6/1982 | Larsen et al. |
| 4,350,874 A | 9/1982 | Nishikawa |
| 4,374,318 A | 2/1983 | Gilliom |
| 4,374,319 A | 2/1983 | Guibert |
| 4,375,184 A | 3/1983 | Gilliom |
| 4,383,823 A | 5/1983 | Williams et al. |
| 4,385,911 A | 5/1983 | Popeil et al. |
| 4,420,679 A | 12/1983 | Howe |
| 4,424,797 A | 1/1984 | Perkins |
| 4,426,923 A | 1/1984 | Ohata |
| 4,439,459 A | 3/1984 | Swartley |
| 4,455,924 A | 6/1984 | Wenzel |
| 4,460,822 A | 7/1984 | Alden et al. |
| 4,461,950 A | 7/1984 | Curless et al. |
| 4,467,777 A | 8/1984 | Weber |
| 4,471,000 A | 9/1984 | Brown et al. |
| 4,476,848 A | 10/1984 | Protas |
| 4,477,706 A | 10/1984 | Mittelsteadt |
| 4,481,396 A | 11/1984 | Matsubayashi et al. |
| 4,483,241 A | 11/1984 | Vaughn |
| 4,484,063 A | 11/1984 | Whittenburg et al. |
| 4,484,064 A | 11/1984 | Murray |
| 4,488,025 A | 12/1984 | Tanabe |
| 4,491,065 A | 1/1985 | Poulson |
| 4,503,760 A | 3/1985 | Pryputsch et al. |
| 4,506,998 A | 3/1985 | Showalter |
| 4,509,412 A | 4/1985 | Whittenburg et al. |
| 4,516,012 A | 5/1985 | Smith et al. |
| 4,535,931 A | 8/1985 | Bartok et al. |
| 4,538,363 A | 9/1985 | Zagoroff |
| 4,554,437 A | 11/1985 | Wagner et al. |
| 4,558,208 A | 12/1985 | Sturdevant et al. |
| 4,561,348 A | 12/1985 | Halters et al. |
| 4,591,333 A | 5/1986 | Henke |
| 4,591,698 A | 5/1986 | Chang |
| 4,596,914 A | 6/1986 | Morino |
| 4,625,097 A | 11/1986 | Miwa |
| 4,629,850 A | 12/1986 | Tanabe |
| 4,629,865 A | 12/1986 | Freedman et al. |
| 4,656,337 A | 4/1987 | Lastofka et al. |
| 4,663,517 A | 5/1987 | Huff et al. |
| 4,683,666 A | 8/1987 | Igusa et al. |
| D293,539 S | 1/1988 | Nishikawa |
| 4,749,581 A | 6/1988 | Gorsuch et al. |
| 4,751,911 A | 6/1988 | Betts et al. |
| 4,756,091 A | 7/1988 | Van Denend |
| 4,757,184 A | 7/1988 | Swanson et al. |
| 4,757,800 A | 7/1988 | Shei et al. |
| 4,781,169 A | 11/1988 | Henke et al. |
| 4,804,812 A | 2/1989 | Tanaka et al. |
| 4,807,862 A | 2/1989 | Popeil et al. |
| 4,817,509 A | 4/1989 | Erickson |
| 4,818,550 A | 4/1989 | Davidson |
| 4,839,502 A | 6/1989 | Swanson et al. |
| D302,095 S | 7/1989 | Nishikawa |
| D302,642 S | 8/1989 | Nishikawa |
| 4,870,255 A | 9/1989 | Fujii et al. |
| 4,913,047 A | 4/1990 | Burley |
| 4,948,106 A | 8/1990 | Popeil et al. |
| D313,679 S | 1/1991 | Sakamoto |
| 5,017,143 A | 5/1991 | Backus et al. |
| 5,029,519 A | 7/1991 | Boyen |
| 5,030,027 A | 7/1991 | Bachrach et al. |
| 5,045,671 A | 9/1991 | Kanaya et al. |
| 5,166,886 A | 2/1992 | Molnar et al. |
| 5,097,112 A | 3/1992 | Kanaya et al. |
| 5,097,754 A | 3/1992 | Covington et al. |
| 5,107,097 A | 4/1992 | Negandhi et al. |
| 5,107,821 A | 4/1992 | von Blanquet |
| 5,133,788 A | 7/1992 | Backus |
| D328,834 S | 8/1992 | Chang |
| 5,157,239 A | 10/1992 | Kanaya et al. |
| 5,165,138 A | 11/1992 | Garabedian |
| 5,165,328 A | 11/1992 | Erickson et al. |

(56) References Cited

U.S. PATENT DOCUMENTS

| | | | |
|---|---|---|---|
| 5,174,196 A * | 12/1992 | Cheatham | A22C 17/006 99/419 |
| 5,181,836 A | 1/1993 | Zeitlin | |
| 5,191,831 A | 3/1993 | Walden | |
| 5,195,145 A | 3/1993 | Backus et al. | |
| 5,197,736 A | 3/1993 | Backus et al. | |
| 5,205,274 A | 4/1993 | Smith et al. | |
| 5,221,962 A | 6/1993 | Backus et al. | |
| 5,235,150 A | 8/1993 | Buske | |
| 5,245,159 A | 9/1993 | Chang | |
| 5,324,185 A | 6/1994 | Backus et al. | |
| 5,337,654 A | 8/1994 | Broberg et al. | |
| 5,338,616 A | 8/1994 | Ishii et al. | |
| 5,352,873 A | 10/1994 | Carlsson et al. | |
| 5,371,829 A | 12/1994 | Hoeberigs | |
| D355,564 S | 2/1995 | Dornbush et al. | |
| 5,392,695 A | 2/1995 | Junkel | |
| 5,403,607 A | 4/1995 | Erickson et al. | |
| 5,404,420 A | 4/1995 | Song | |
| 5,416,886 A | 5/1995 | Zahler | |
| D358,963 S | 6/1995 | Kaneko | |
| 5,421,316 A | 6/1995 | Heber | |
| 5,421,713 A | 6/1995 | Backus et al. | |
| 5,423,249 A | 6/1995 | Meyer | |
| 5,438,916 A | 8/1995 | Dornbush et al. | |
| 5,451,744 A | 9/1995 | Koopman et al. | |
| 5,465,651 A | 11/1995 | Erickson et al. | |
| 5,466,912 A | 11/1995 | Dornbush et al. | |
| 5,481,962 A | 1/1996 | Tedesco | |
| 5,484,621 A | 1/1996 | Erickson et al. | |
| 5,485,780 A | 1/1996 | Koether et al. | |
| D367,396 S | 2/1996 | Hsu | |
| 5,500,237 A | 3/1996 | Gell, Jr. et al. | |
| D369,274 S | 4/1996 | Dornbush et al. | |
| D369,514 S | 5/1996 | Baldwin | |
| 5,513,558 A | 5/1996 | Erickson et al. | |
| 5,515,990 A | 5/1996 | Popeil et al. | |
| 5,520,096 A | 5/1996 | Dornbush et al. | |
| 5,533,444 A | 7/1996 | Parks | |
| 5,534,681 A | 7/1996 | Hwang | |
| 5,545,874 A | 8/1996 | Hansson | |
| 5,548,102 A | 8/1996 | Kwon | |
| 5,552,585 A | 9/1996 | Fleck et al. | |
| 5,558,793 A | 9/1996 | McKee et al. | |
| 5,560,285 A | 10/1996 | Moreth | |
| 5,598,769 A | 2/1997 | Luebke et al. | |
| 5,614,239 A | 3/1997 | Tedesco | |
| 5,666,868 A | 9/1997 | Diete et al. | |
| 5,676,044 A | 10/1997 | Lara, Jr. | |
| 5,676,870 A | 10/1997 | Wassman et al. | |
| 5,693,246 A | 12/1997 | Han et al. | |
| 5,699,722 A | 12/1997 | Erickson | |
| 5,720,991 A | 2/1998 | Gildersleeve et al. | |
| 5,731,012 A | 3/1998 | Backus et al. | |
| 5,735,190 A | 4/1998 | Sham | |
| 5,739,736 A | 4/1998 | Lee | |
| 5,747,781 A | 5/1998 | Kim et al. | |
| 5,793,023 A | 8/1998 | Hong et al. | |
| 5,801,357 A | 9/1998 | Danen | |
| 5,801,362 A | 9/1998 | Pearlman et al. | |
| 5,845,563 A | 12/1998 | Haring et al. | |
| RE36,147 E | 3/1999 | Backus et al. | |
| 5,877,477 A | 3/1999 | Petty et al. | |
| 5,878,508 A | 3/1999 | Knoll et al. | |
| 5,880,436 A | 3/1999 | Keogh | |
| 5,882,116 A | 3/1999 | Backus | |
| 5,934,178 A | 8/1999 | Caridis et al. | |
| 5,938,959 A | 8/1999 | Wang | |
| 5,974,957 A | 11/1999 | Ysen | |
| 5,994,673 A | 11/1999 | El-Shoubary et al. | |
| 6,012,444 A | 1/2000 | Skender | |
| 6,018,146 A | 1/2000 | Uzgiris et al. | |
| 6,027,513 A | 2/2000 | Massana Florensa | |
| D424,862 S | 5/2000 | Holbrook | |
| 6,069,345 A | 5/2000 | Westerberg | |
| 6,085,442 A | 7/2000 | Erickson | |
| 6,091,057 A | 7/2000 | Asami et al. | |
| 6,093,918 A | 7/2000 | Sohn | |
| 6,093,919 A | 7/2000 | Seo et al. | |
| 6,104,014 A | 8/2000 | Chung | |
| 6,114,664 A | 9/2000 | Cook et al. | |
| 6,127,666 A | 10/2000 | Sohn | |
| 6,142,064 A | 11/2000 | Backus et al. | |
| 6,170,390 B1 | 1/2001 | Backus et al. | |
| 6,172,347 B1 | 1/2001 | Lee | |
| 6,173,645 B1 | 1/2001 | Backus et al. | |
| 6,198,076 B1 | 3/2001 | Moen et al. | |
| 6,201,217 B1 | 3/2001 | Moon et al. | |
| 6,227,848 B1 | 5/2001 | Imai | |
| 6,240,838 B1 | 6/2001 | Backus et al. | |
| 6,250,214 B1 | 6/2001 | Backus et al. | |
| 6,253,665 B1 | 7/2001 | Backus et al. | |
| 6,255,630 B1 | 7/2001 | Barnes et al. | |
| 6,262,406 B1 | 7/2001 | McKee et al. | |
| 6,450,087 B2 | 10/2001 | Backus et al. | |
| 6,314,955 B1 | 11/2001 | Boetcker | |
| 6,316,757 B1 | 11/2001 | Kim et al. | |
| 6,568,315 B2 | 11/2001 | Backus et al. | |
| 6,330,855 B2 | 12/2001 | Backus et al. | |
| 6,363,836 B1 | 4/2002 | Usherovich | |
| 6,369,360 B1 | 4/2002 | Cook | |
| 6,373,037 B1 | 4/2002 | Brown et al. | |
| 6,393,972 B1 | 5/2002 | Backus et al. | |
| 6,408,742 B1 | 6/2002 | Backus et al. | |
| 6,422,136 B1 | 7/2002 | Backus et al. | |
| 6,433,324 B1 | 8/2002 | Kim | |
| 6,436,380 B1 | 8/2002 | Pond et al. | |
| 6,874,408 B2 | 8/2002 | Backus et al. | |
| 6,448,540 B1 | 9/2002 | Braunisch et al. | |
| 6,837,150 B2 | 10/2002 | Backus et al. | |
| 6,502,265 B2 | 1/2003 | Blair et al. | |
| D469,657 S | 2/2003 | Becker et al. | |
| 6,521,870 B2 | 2/2003 | Nolan et al. | |
| 6,536,334 B2 | 3/2003 | Backus et al. | |
| 6,568,316 B1 | 5/2003 | Backus et al. | |
| 6,578,470 B2 | 6/2003 | Backus et al. | |
| 6,592,364 B2 | 7/2003 | Zapata | |
| 6,840,161 B2 | 7/2003 | Backus et al. | |
| 6,617,554 B2 | 9/2003 | Moon et al. | |
| 6,657,167 B2 | 12/2003 | Loveless | |
| 6,658,991 B2 | 12/2003 | Backus et al. | |
| 6,686,567 B1 | 2/2004 | Hwang | |
| D487,670 S | 3/2004 | Moon et al. | |
| 6,723,962 B1 | 4/2004 | Sit | |
| 6,727,478 B2 | 4/2004 | Rael et al. | |
| 6,730,880 B2 | 5/2004 | Smith et al. | |
| D490,648 S | 6/2004 | Moon et al. | |
| 6,742,445 B2 | 6/2004 | Backus et al. | |
| 6,743,007 B2 | 6/2004 | Backus et al. | |
| 6,747,250 B1 | 6/2004 | Cha | |
| 6,782,805 B2 | 8/2004 | Backus et al. | |
| 6,782,806 B2 | 8/2004 | Backus et al. | |
| 6,805,112 B2 | 10/2004 | Cole et al. | |
| 6,809,297 B2 | 10/2004 | Moon et al. | |
| 6,809,301 B1 | 10/2004 | McIntyre et al. | |
| 6,814,957 B1 | 11/2004 | Pond et al. | |
| 6,894,260 B2 | 5/2005 | Yamauchi et al. | |
| 6,917,016 B2 | 7/2005 | Backer et al. | |
| 6,917,017 B2 | 7/2005 | Moon et al. | |
| 6,917,018 B1 | 7/2005 | Wong | |
| 6,936,795 B1 | 8/2005 | Moon et al. | |
| 7,424,849 B2 | 8/2005 | Backus et al. | |
| 6,940,049 B2 | 9/2005 | Harwell et al. | |
| 6,943,321 B2 | 9/2005 | Carbone et al. | |
| 6,965,095 B1 | 11/2005 | Popeil et al. | |
| 6,967,314 B2 | 11/2005 | Sauter et al. | |
| 6,988,445 B1 | 1/2006 | Backus et al. | |
| 7,012,220 B2 | 3/2006 | Boyer et al. | |
| 7,015,440 B2 | 3/2006 | Ryu | |
| 7,021,203 B2 | 4/2006 | Backus et al. | |
| 7,021,204 B2 | 4/2006 | Backus et al. | |
| 7,044,122 B2 | 5/2006 | Personnettaz et al. | |
| 7,045,751 B2 | 5/2006 | Kim | |
| 7,059,253 B2 | 6/2006 | Cho | |

(56) References Cited

U.S. PATENT DOCUMENTS

| | | |
|---|---|---|
| 7,065,883 B2 | 6/2006 | Popeil et al. |
| 7,138,609 B2 | 11/2006 | Popeil et al. |
| 7,153,120 B2 | 12/2006 | Backus et al. |
| 7,159,510 B2 | 1/2007 | Lamaster |
| 7,395,602 B2 | 5/2007 | Backus et al. |
| 7,225,729 B2 | 6/2007 | Backus et al. |
| 7,225,730 B2 | 6/2007 | Backus et al. |
| 7,282,683 B2 | 10/2007 | Yamauchi et al. |
| 7,308,852 B2 | 12/2007 | Kaminaka et al. |
| 7,323,663 B2 | 1/2008 | Cavada et al. |
| 7,325,484 B1 | 2/2008 | Backus et al. |
| 7,348,521 B2 | 3/2008 | Lee et al. |
| 7,360,533 B2 | 4/2008 | McFadden |
| 7,371,999 B1 | 5/2008 | Douglas et al. |
| 7,479,006 B2 | 1/2009 | Newsom |
| 7,487,716 B2 | 2/2009 | Swank et al. |
| 7,500,428 B2 | 3/2009 | Backus et al. |
| 7,514,651 B2 | 4/2009 | Popeil et al. |
| 7,554,061 B2 | 6/2009 | Ruther et al. |
| 7,619,186 B2 | 11/2009 | Cavada et al. |
| 7,626,142 B2 | 12/2009 | Backus et al. |
| 7,681,494 B2 | 3/2010 | Backus et al. |
| 7,683,292 B2 | 3/2010 | Cavada et al. |
| 7,739,948 B2 | 6/2010 | Backus et al. |
| 8,186,265 B2 | 10/2010 | Popeil et al. |
| 7,871,499 B2 | 1/2011 | Gehring et al. |
| 7,878,111 B2 | 2/2011 | Backus et al. |
| 7,901,721 B2 | 3/2011 | Oosterling |
| 7,964,824 B2 | 6/2011 | Moon |
| 7,973,264 B2 | 7/2011 | Li |
| 7,998,514 B2 | 8/2011 | Backus et al. |
| 8,017,167 B2 | 9/2011 | Backus et al. |
| 8,138,452 B2 | 3/2012 | Thomas et al. |
| 8,309,151 B2 | 11/2012 | Popeil et al. |
| 8,330,083 B2 | 12/2012 | Moon et al. |
| 8,347,781 B2 | 1/2013 | Stack |
| 8,367,978 B2 | 2/2013 | Williams |
| 8,387,520 B2 | 3/2013 | Backus |
| 8,505,528 B2 | 8/2013 | Chien et al. |
| D693,643 S | 11/2013 | Moon et al. |
| 8,707,857 B2 | 4/2014 | Popeil |
| 8,735,778 B2 | 5/2014 | Greenwood et al. |
| 8,776,675 B1 | 7/2014 | Meris et al. |
| 8,807,022 B2 | 8/2014 | Backus |
| 8,835,810 B2 | 9/2014 | Moon |
| 8,850,965 B2 | 10/2014 | Popeil et al. |
| 8,857,323 B1 | 10/2014 | Alkadban |
| 8,869,686 B2 | 10/2014 | Backus |
| 8,919,339 B2 | 12/2014 | Mazzetti et al. |
| 9,074,776 B2 | 7/2015 | Greenwood et al. |
| 9,167,930 B2 | 10/2015 | Chang |
| D743,201 S | 11/2015 | Aderka |
| 9,433,321 B2 | 9/2016 | Piazzi |
| 9,498,083 B2 | 11/2016 | Goderiaux et al. |
| D791,930 S | 7/2017 | Rivera |
| 9,746,189 B2 | 8/2017 | Kantas |
| 9,933,166 B2 | 4/2018 | Matarazzi et al. |
| 10,119,708 B2 | 11/2018 | Bartelick et al. |
| 10,427,857 B2 | 10/2019 | van den Berg |
| 10,440,545 B2 | 10/2019 | Horton et al. |
| 10,444,723 B2 | 10/2019 | Young et al. |
| 2001/0006627 A1 | 7/2001 | Pond et al. |
| 2001/0009128 A1 | 7/2001 | Backus et al. |
| 2001/0022140 A1 | 9/2001 | Backus et al. |
| 2001/0032547 A1 | 10/2001 | Backus et al. |
| 2001/0039884 A1 | 11/2001 | Backus et al. |
| 2001/0042449 A1 | 11/2001 | Backus et al. |
| 2001/0046337 A1 | 11/2001 | Backus et al. |
| 2002/0017201 A1 | 2/2002 | Backus et al. |
| 2002/0023541 A1 | 2/2002 | Sanchez |
| 2002/0023545 A1 | 2/2002 | Backus |
| 2002/0023546 A1 | 2/2002 | Backus et al. |
| 2002/0050212 A1 | 5/2002 | Backus et al. |
| 2002/0062742 A1 | 5/2002 | Backus et al. |
| 2002/0069768 A1 | 6/2002 | Backus et al. |
| 2002/0088350 A1 | 7/2002 | Backus et al. |
| 2002/0108500 A1 | 8/2002 | Backus et al. |
| 2002/0108503 A1 | 8/2002 | Backus et al. |
| 2002/0144607 A1 | 10/2002 | Backus |
| 2002/0157543 A1 | 10/2002 | Backus et al. |
| 2002/0166458 A1 | 11/2002 | Backus et al. |
| 2002/0195003 A1 | 12/2002 | Backus et al. |
| 2003/0019368 A1 | 1/2003 | Backus et al. |
| 2003/0062360 A1 | 4/2003 | Moon et al. |
| 2003/0101877 A1 | 6/2003 | Backus et al. |
| 2003/0126997 A1 | 7/2003 | Backus et al. |
| 2003/0146201 A1 | 8/2003 | Smith |
| 2003/0146205 A1 | 8/2003 | Rael |
| 2004/0006876 A1 | 1/2004 | Popeil et al. |
| 2004/0007494 A1 | 1/2004 | Popeil et al. |
| 2004/0020311 A1 | 2/2004 | Cullion |
| 2004/0144260 A1 | 7/2004 | Backus et al. |
| 2004/0194644 A1 | 10/2004 | Backus et al. |
| 2005/0056633 A1 | 3/2005 | Backus et al. |
| 2005/0058738 A1 | 3/2005 | Backus et al. |
| 2005/0139592 A1 | 6/2005 | Kim |
| 2005/0172835 A1 | 8/2005 | Lamaster |
| 2005/0178275 A1 | 8/2005 | Backus et al. |
| 2005/0178763 A1 | 8/2005 | Yamauchi et al. |
| 2005/0284306 A1 | 12/2005 | Backus et al. |
| 2006/0006163 A1 | 1/2006 | Carbone et al. |
| 2006/0144250 A1 | 3/2006 | Backus |
| 2006/0081594 A1 | 4/2006 | Popeil et al. |
| 2006/0081595 A1 | 4/2006 | Popeil et al. |
| 2006/0144248 A1 | 7/2006 | Backus et al. |
| 2006/0144384 A1 | 7/2006 | Santagata |
| 2006/0225580 A1 | 10/2006 | Fernandez |
| 2007/0028780 A1 | 2/2007 | Popeil et al. |
| 2007/0028781 A1 | 2/2007 | Popeil et al. |
| 2007/0034621 A1 | 2/2007 | Popeil et al. |
| 2007/0101585 A1 | 5/2007 | Popeil et al. |
| 2007/0145061 A1 | 6/2007 | Backus et al. |
| 2007/0221663 A1 | 9/2007 | Brooks |
| 2007/0256571 A1 | 11/2007 | Popeil et al. |
| 2008/0075817 A1 | 3/2008 | Backus et al. |
| 2008/0092751 A1 | 4/2008 | Backus et al. |
| 2008/0099460 A1 | 5/2008 | Douglas et al. |
| 2008/0099461 A1 | 5/2008 | Li |
| 2008/0190911 A1 | 8/2008 | Adamski |
| 2008/0250940 A1 | 10/2008 | Backus et al. |
| 2008/0265594 A1 | 10/2008 | Popeil et al. |
| 2008/0286429 A1 | 11/2008 | Oosterling |
| 2009/0017408 A1 | 1/2009 | Pakkala et al. |
| 2009/0025248 A1 | 1/2009 | Lannon |
| 2009/0090248 A1 | 4/2009 | Backus et al. |
| 2009/0090251 A1 | 4/2009 | Stack |
| 2009/0120303 A1 | 5/2009 | Popeil et al. |
| 2009/0139981 A1 | 6/2009 | Moon |
| 2009/0173240 A1 | 7/2009 | Backus et al. |
| 2009/0191322 A1 | 7/2009 | Popeil et al. |
| 2009/0321410 A1* | 12/2009 | Moon ............... F26B 9/003 |
| | | 219/392 |
| 2010/0071565 A1 | 3/2010 | Backus et al. |
| 2010/0089248 A1 | 4/2010 | Jones |
| 2010/0089379 A1 | 4/2010 | Cheng |
| 2010/0173050 A1 | 7/2010 | Backus et al. |
| 2010/0199859 A1 | 8/2010 | Chang |
| 2010/0260910 A1 | 10/2010 | Backus et al. |
| 2010/0269712 A1 | 10/2010 | Popeil et al. |
| 2010/0303973 A1 | 12/2010 | Popeil et al. |
| 2011/0083565 A1 | 4/2011 | Backus |
| 2011/0083566 A1 | 4/2011 | Backus |
| 2011/0132891 A1 | 6/2011 | Backus et al. |
| 2011/0185917 A1 | 8/2011 | Goderiaux et al. |
| 2011/0203570 A1 | 8/2011 | Popeil et al. |
| 2012/0067903 A1 | 3/2012 | Chang |
| 2012/0167778 A1 | 7/2012 | Popeil et al. |
| 2012/0247343 A1 | 10/2012 | Chang |
| 2013/0180413 A1 | 7/2013 | Tjerkgaast et al. |
| 2013/0180415 A1 | 7/2013 | Backus |
| 2013/0206016 A1* | 8/2013 | Diaz ............... A47J 37/0704 |
| | | 99/339 |
| 2014/0021191 A1 | 1/2014 | Moon et al. |
| 2014/0224132 A1 | 8/2014 | Chang |

(56) References Cited

U.S. PATENT DOCUMENTS

| | | |
|---|---|---|
| 2014/0227411 A1 | 8/2014 | Backus |
| 2014/0245897 A1 | 9/2014 | Li |
| 2014/0311360 A1 | 10/2014 | Bartelick et al. |
| 2015/0101495 A1 | 4/2015 | Backus |
| 2016/0150915 A1 | 6/2016 | Yu et al. |
| 2016/0183709 A1 | 6/2016 | Backus |
| 2016/0324358 A1 | 11/2016 | Backus |
| 2016/0345610 A1 | 12/2016 | Backus |
| 2017/0074584 A1 | 3/2017 | Backus |
| 2017/0208825 A1 | 7/2017 | Backus |
| 2017/0311757 A1 | 11/2017 | Backus et al. |
| 2018/0000285 A1 | 1/2018 | Backus |
| 2018/0000286 A1 | 1/2018 | Backus |
| 2018/0000287 A1 | 1/2018 | Backus |
| 2018/0049590 A1 | 2/2018 | Backus |
| 2018/0064147 A1 | 3/2018 | Backus |
| 2018/0192825 A1 | 7/2018 | Popeil et al. |
| 2018/0255955 A1 | 9/2018 | Backus |
| 2018/0264241 A1 | 9/2018 | Backus |
| 2019/0093324 A1 | 3/2019 | Backus |
| 2019/0142215 A1 | 5/2019 | Popeil et al. |
| 2019/0142218 A1 | 5/2019 | Popeil et al. |
| 2019/0167027 A1 | 6/2019 | Backus |
| 2019/0281869 A1 | 9/2019 | Backus |
| 2019/0328179 A1 | 10/2019 | Popeil |

FOREIGN PATENT DOCUMENTS

| | | |
|---|---|---|
| DE | 2632000 | 3/1978 |
| EP | 0612494 | 8/1994 |
| EP | 0872203 | 10/1998 |
| WO | WO1991012756 | 9/1991 |
| WO | WO1994015509 | 7/1994 |
| WO | WO1994017708 | 8/1994 |
| WO | WO1994023627 | 10/1994 |
| WO | WO2015028940 | 3/2015 |

\* cited by examiner

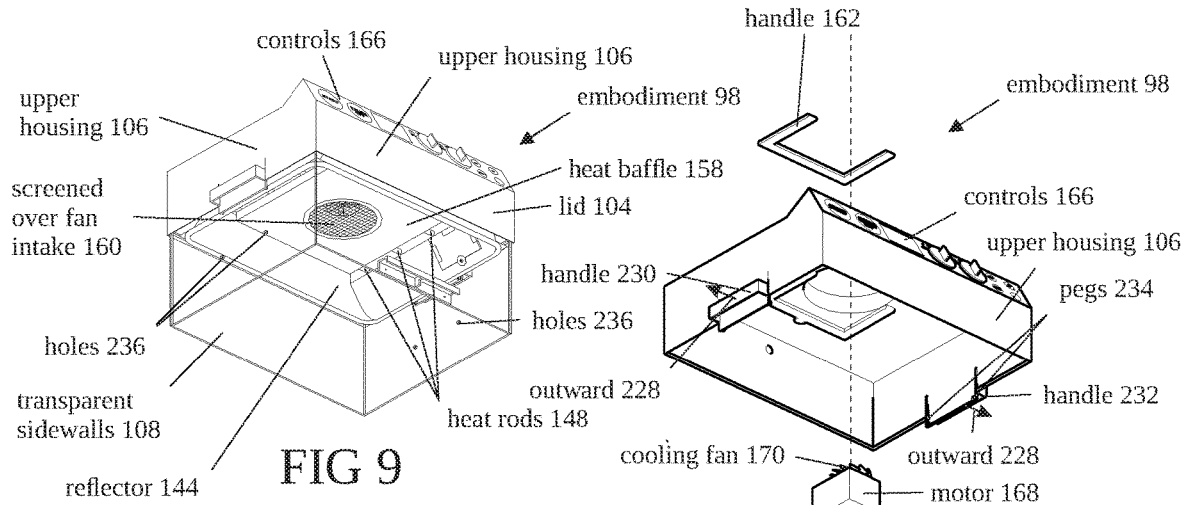
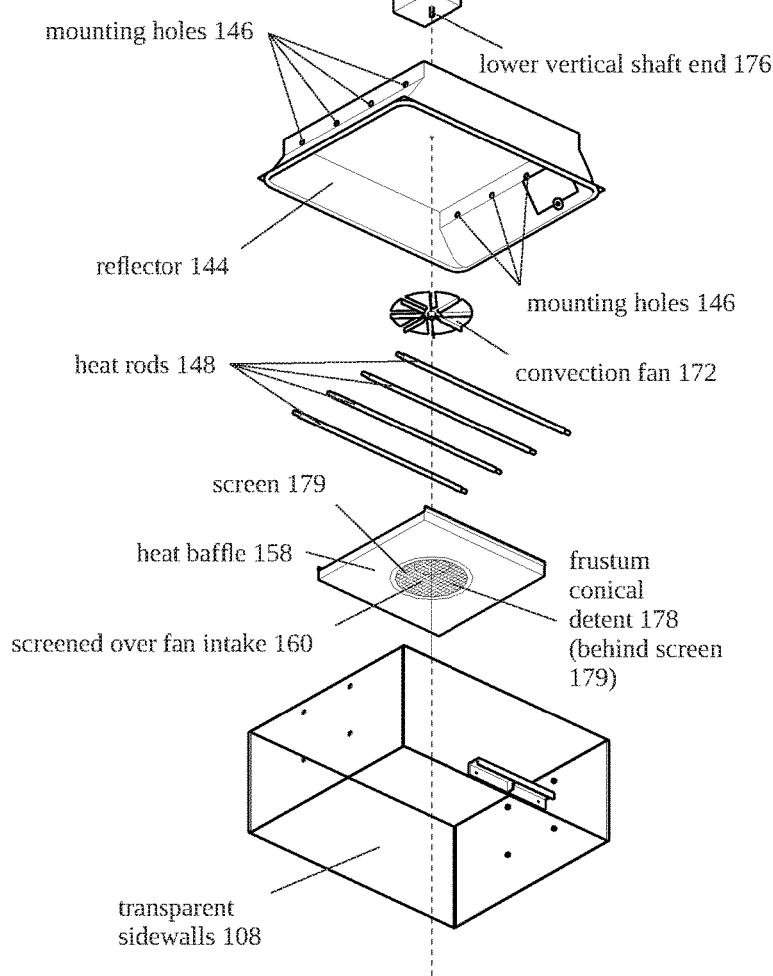

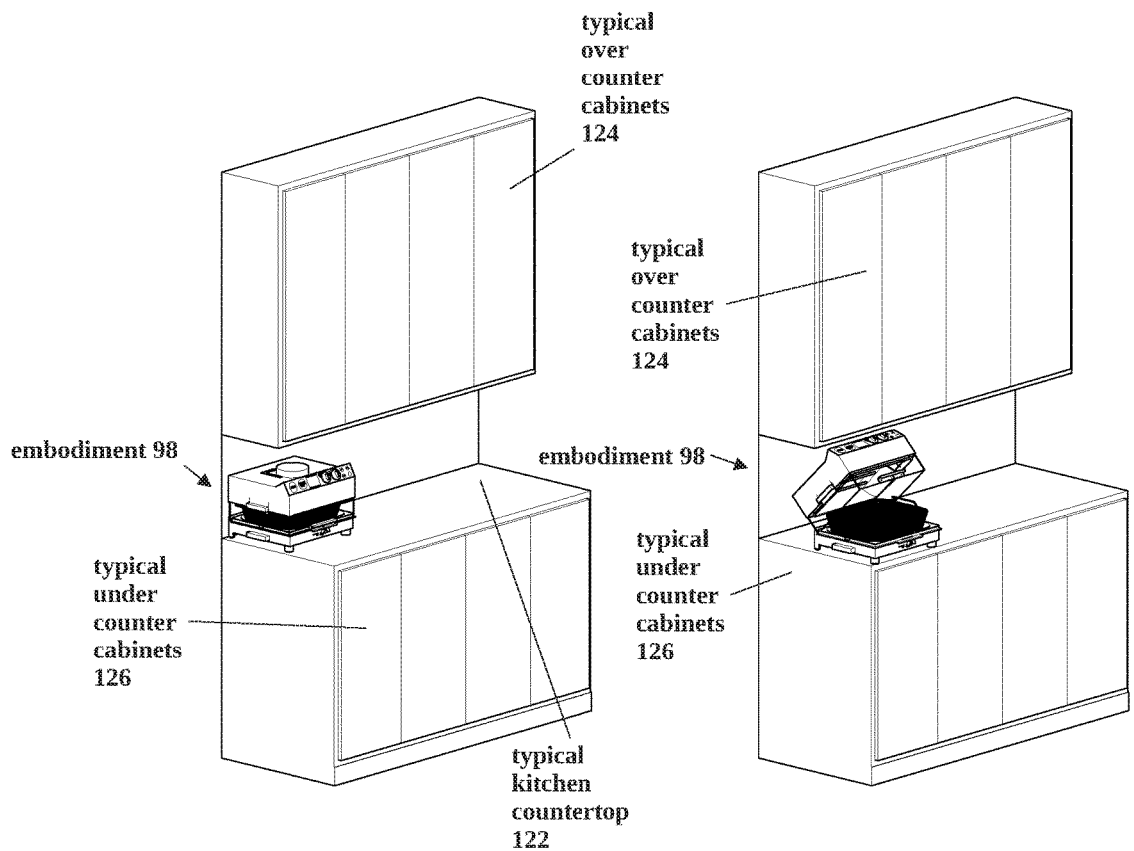
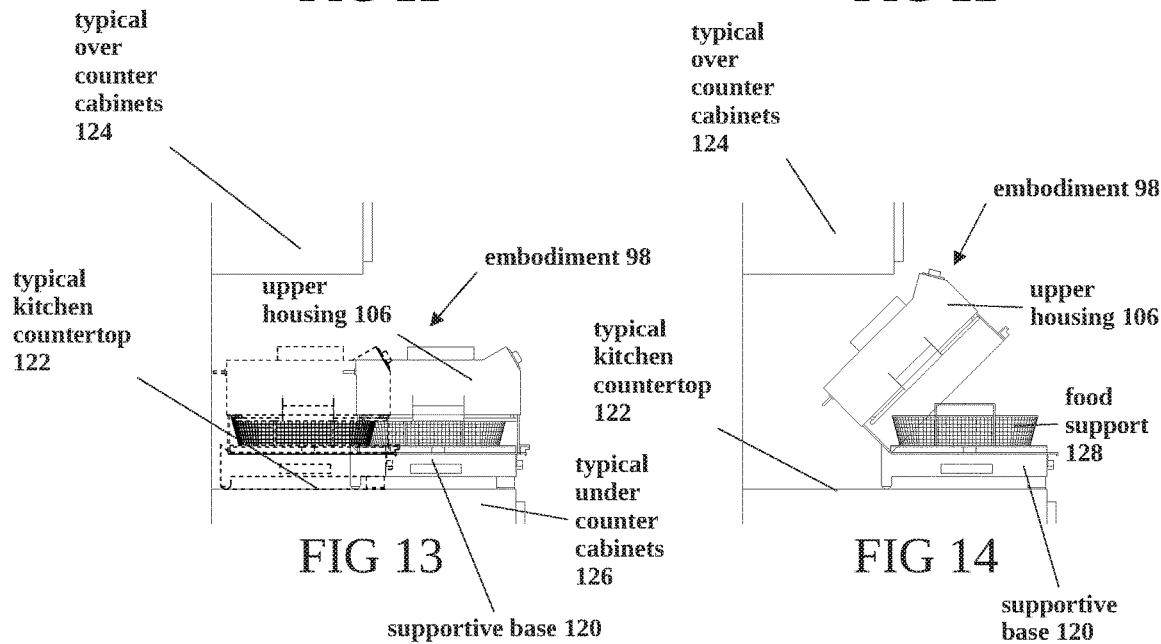

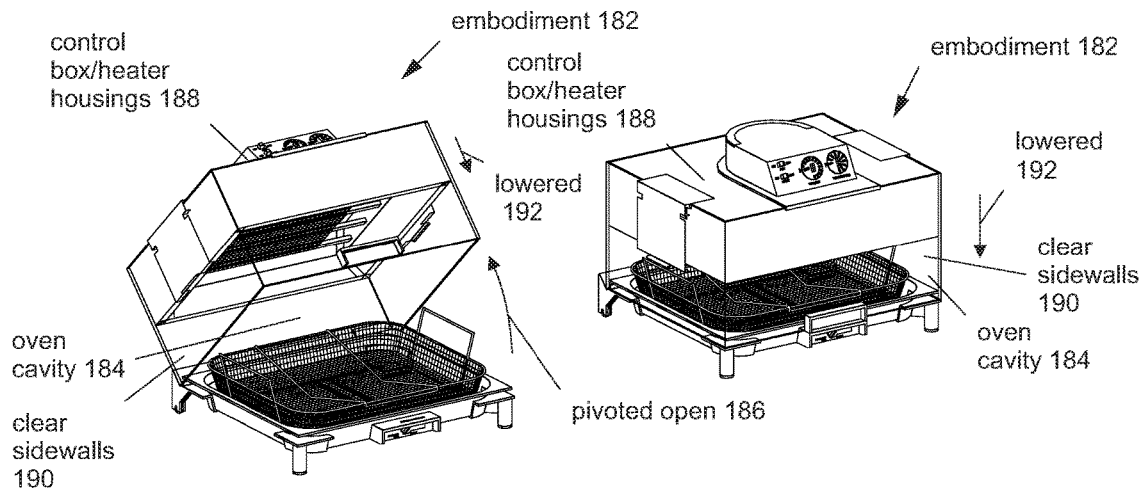
FIG 38
FIG 39
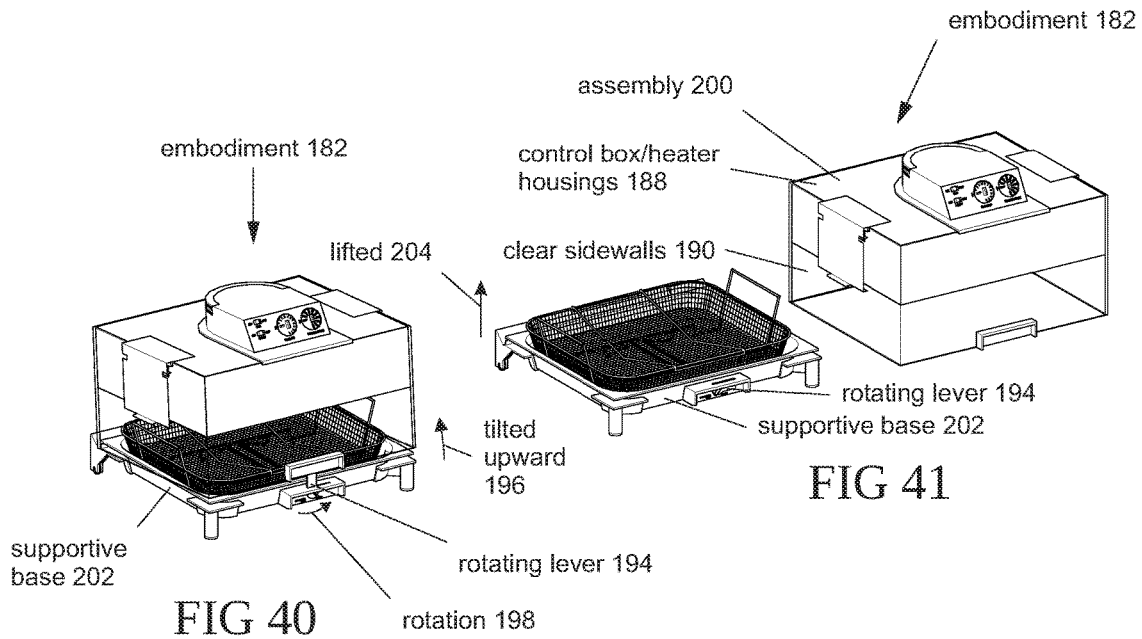
FIG 40
FIG 41 edge 111   cooking mode knob 116 fryer mode 118   cooking mode knob 116 cooking mode knob 116

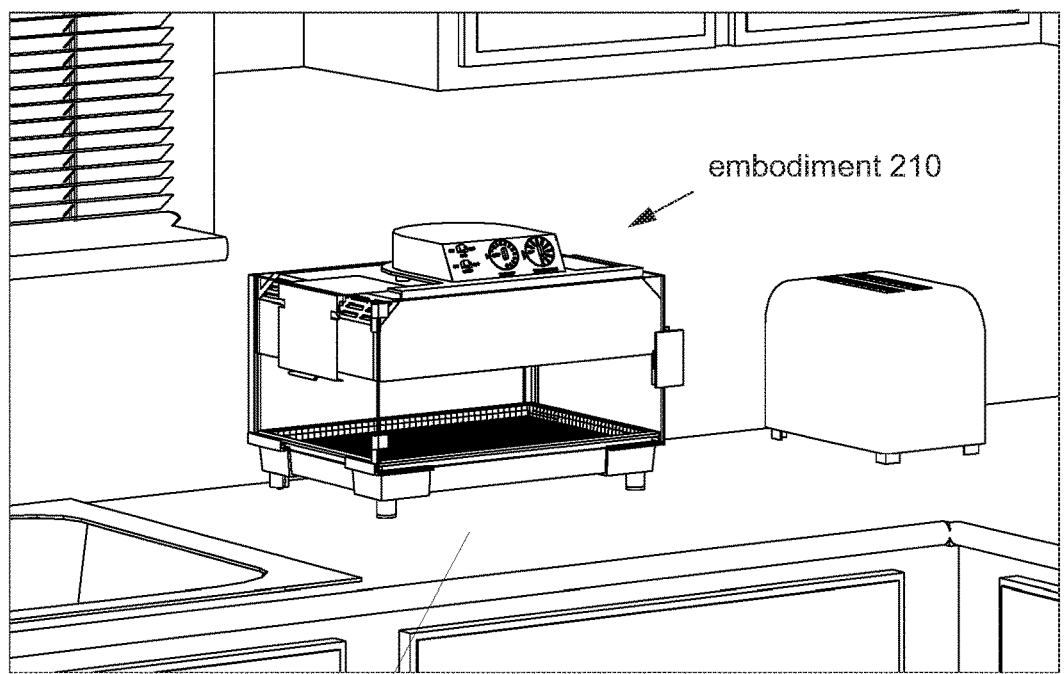
FIG 64
typical kitchen countertop 218
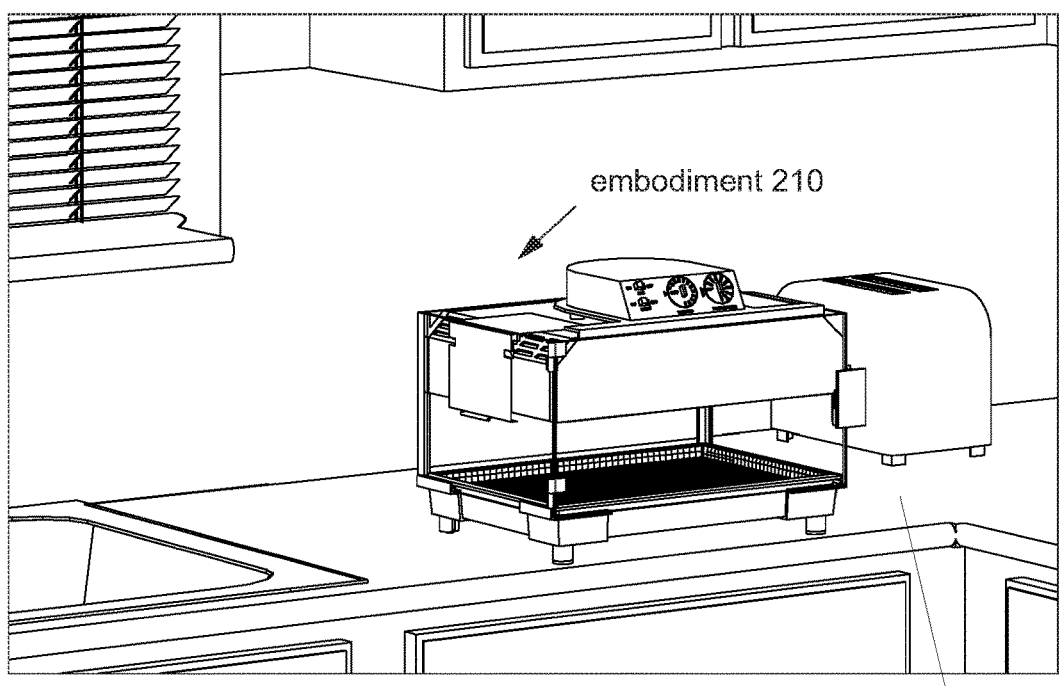
FIG 65   typical kitchen countertop 218

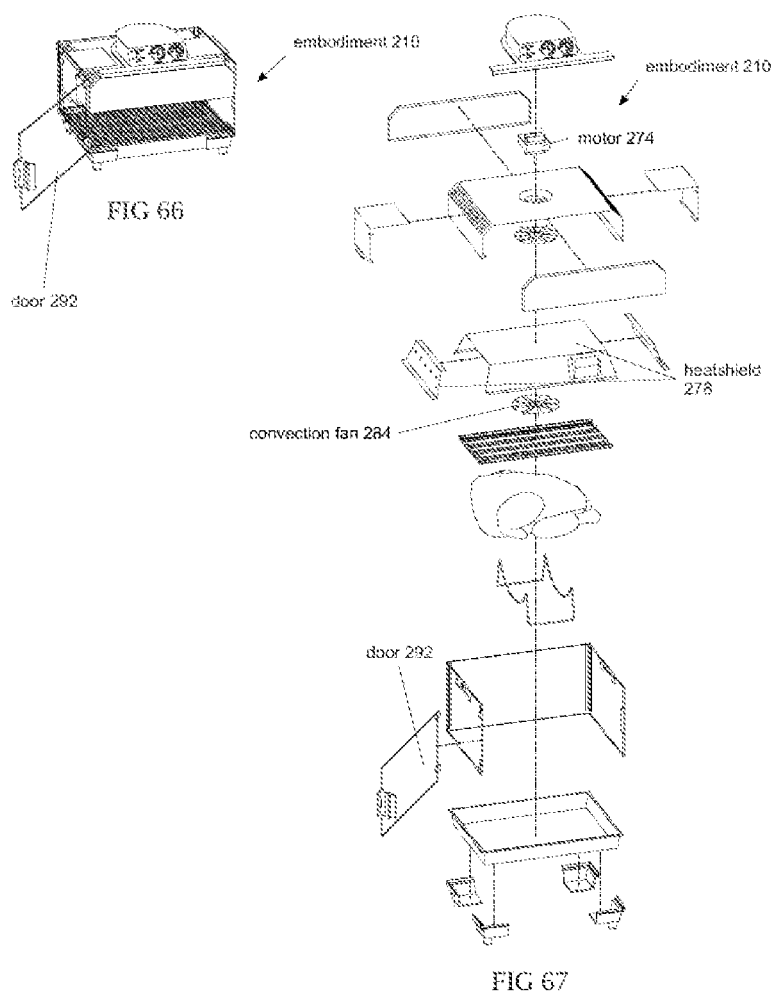

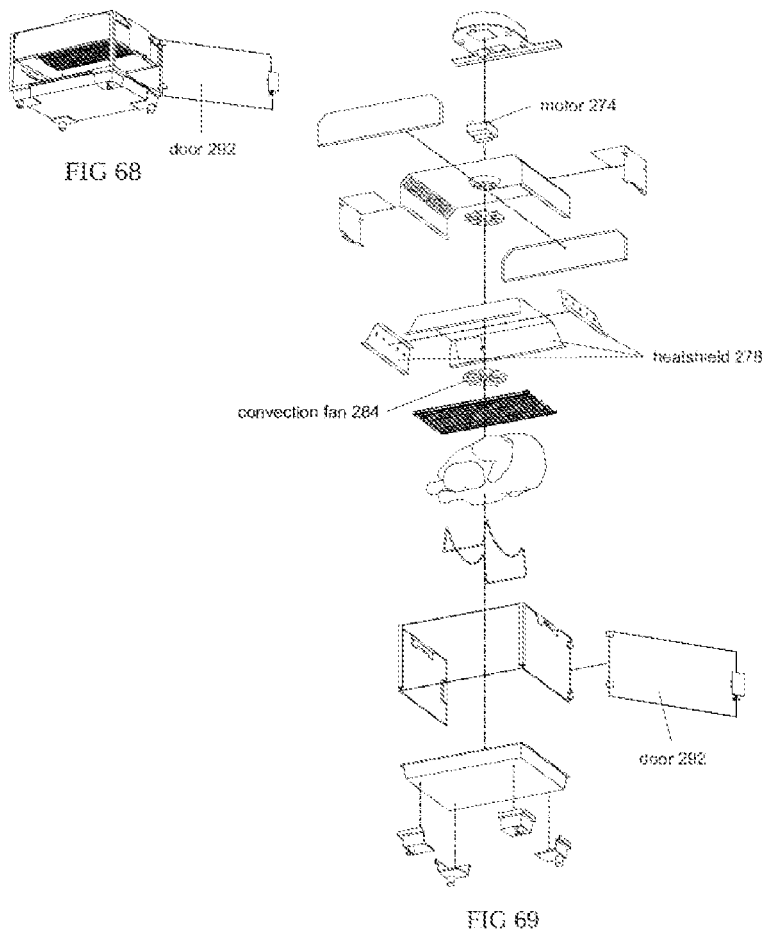

VARIABLE CAPACITY OVEN

CROSS-REFERENCE TO RELATED APPLICATIONS

This application is a continuation-in-part of application Ser. No. 16/189,650 filed on Nov. 13, 2018, which is a continuation-in-part of application Ser. No. 15/862,175 filed Jan. 4, 2018, which claims the benefit of U.S. Provisional Application No. 62/584,374 filed Nov. 10, 2017. Application Ser. No. 16/189,650 also claims the benefit of U.S. Provisional Application No. 62/715,897 filed on Aug. 8, 2018, and also claims the benefit of U.S. Provisional Application No. 62/584,374 filed Nov. 10, 2017. This application is also a continuation-in-part of application Ser. No. 15/862,175 filed on Jan. 4, 2018, which claims the benefit of U.S. Provisional Application No. 62/584,374 filed Nov. 10, 2017, all of which are incorporated herein by reference.

TECHNICAL FIELD

The present application is directed toward devices which heat and cook food, and more specifically, to such devices that may be used on a countertop in a kitchen, or on other supporting surfaces.

BACKGROUND

The larger the size of an oven cavity, the more time it will take to heat it up, however, the more food capacity it will have. The smaller the size of an oven cavity, the less time it will take it to heat it up, but it will suffer from limited food capacity.

Current kitchen ovens fall generally into three categories; big, medium, and small. Big, being typical kitchen built-in ovens. Medium typically being large countertop ovens which resemble a microwave. And small typically being toaster ovens.

And because of the heat up time versus food capacity issues just mentioned, each has predictable advantages and disadvantages. As examples, large built-in kitchen ovens typically take a long time to heat up, but generally have capacity large enough to cook even a large Thanksgiving day turkey. Small toaster ovens generally are great for quickly cooking toast, chicken wings and other small foods, but they don't have capacity for anything much larger. And medium sized ovens are generally just a predictable compromise.

It would be nice to have an oven which has food capacity when needed, but can be compacted to rapidly cook smaller foods.

Emerging with the latest round of kitchen ovens, and particularly with medium-size countertop ovens, are ovens which promote themselves as multipurpose kitchen appliances which typically can at least: oven bake, air fry, and convection oven bake.

Generally, air fryers are distinguished from both ovens and convection ovens, because air fryers are designed to dehydrate the outer surfaces of foods, and thus make the outer surfaces crisp. Typically dedicated air fryers have large vents to help remove interior warm moist air from their oven cavities, and substitute it with outside dryer air to help in the crisping process.

Ovens and convection ovens generally don't have such venting.

BRIEF DESCRIPTION OF THE DRAWINGS

FIG. 9 is a lower frontal perspective of lid 104, including transparent sidewalls 108 and upper housing 106.

FIG. 10 is an exploded perspective of FIG. 9.

FIG. 11 is a frontal perspective view of embodiment 98 resting in its closed configuration (FIG. 2) near the back of typical kitchen countertop 122, including showing typical over-counter cabinets 124 and typical under-counter cabinets 126.

FIG. 12 is the same as FIG. 11, except embodiment 98 is resting in its open (FIG. 1) configuration near the front of typical kitchen countertop 122.

FIG. 13 shows a side view of FIG. 11.

FIG. 14 shows a side view of FIG. 12.

FIG. 30 and its detail.

FIG. 33 is a detail of FIG. 30, as indicated in FIG. 30.

FIG. 38 is a forward perspective of embodiment 182 with control box/heater housings 188 lowered 192 within clear sidewalls 190 to reduce the volume of oven cavity 184 to its minimum volume. FIG. 38 is a perspective of embodiment 182 which is similar to embodiment 98, however with construction simplifications to support base 120 (FIG. 37). FIG. 38 shows embodiment 182 with its control box/heater housing 188 pivoted open 186.

FIG. 39 is a perspective taken from the same viewpoint as FIG. 38, however control box/heater housing 188, and attached clear sidewalls 190 are lowered 192 to fully enclose oven cavity 184.

FIG. 40 is taken from the same viewpoint as FIG. 39, however control box/heater housing 188 and attached clear sidewalls 190 are tilted upward 196 by the rotation 198 of rotating lever 194 configured to allow a controlled amount of venting into and out of oven cavity 184, and thus, at least facilitate the crisping of foods.

FIG. 41 is taken from the same viewpoint as FIG. 40, however assembly 200, comprising control box/heater housing 188 and clear sidewalls 190, has been manually lifted 204 and removed from supportive base 202.

In FIG. 42, oven cavity 184 has been expanded to its maximum volume, by control box/heater housings 188 being raised 208 and locked within clear sidewalls 190.

FIG. 48a is a detail of FIG. 48, as indicated in FIG. 48.

FIG. 62 is a perspective of embodiment 210 taken from below and behind embodiment 210.

FIG. 63 is a detail of FIG. 62, as indicated in FIG. 62.

FIG. 64 is a perspective of embodiment 210 sitting near the back of typical kitchen countertop 218.

FIG. 65 is a perspective of embodiment 210 taken from the same perspective viewpoint of FIG. 64, with embodiment 210 sitting near the front of typical kitchen countertop 218. Moving back-to-front or front-to-back in a predictable track, on a countertop with embodiment 210 is facilitated by wheels 268, which permit easy, drawer like, contained orthogonal movement of embodiment 210.

FIG. 66 is a perspective of assembled embodiment 210.

FIG. 67 is a perspective of exploded embodiment 210 taken from the same perspective viewpoint of FIG. 66.

FIG. 68 is a perspective of assembled embodiment 210 taken from below and behind embodiment 210.

FIG. 69 is a perspective of exploded embodiment 210 taken from the same perspective viewpoint as FIG. 68.

FIG. 70 illustrates how motor cooling air 272 (heavy dotted lines) is moved past motor 274, urged by cooling fan 276. After exiting fan 276, air exits cooling fan 276 generally horizontal and exhaust out louvers 282 after passing over heatshield 278.

Energized by convection fan 284 air is circulated 286 throughout oven cavity 283 until the air reenters convection fan 284.

Figure 71:
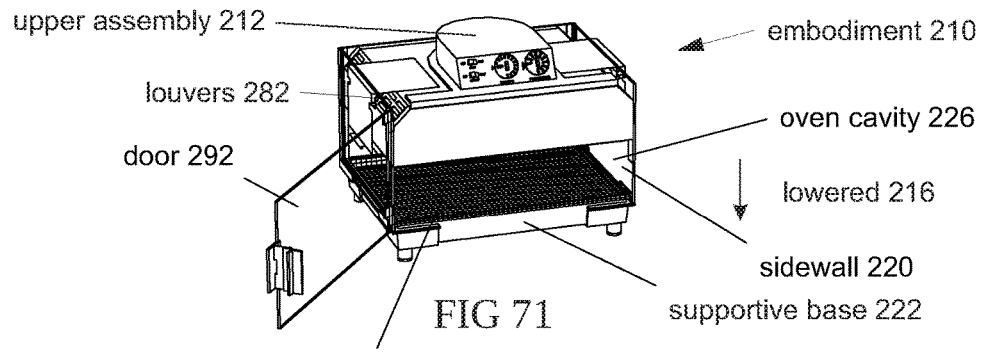

FIG. 71 is a perspective of embodiment 210 with upper assembly 212 in its lowered 216 disposition.

Figure 72:
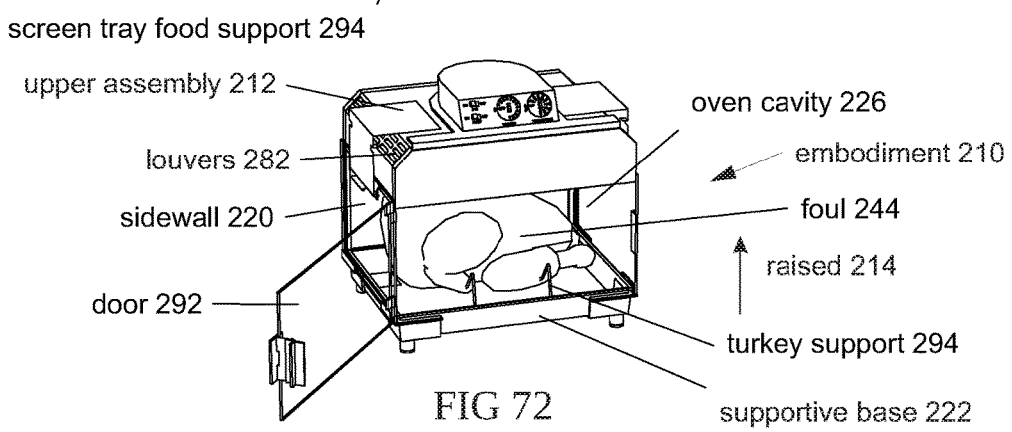

FIG. 72 is a perspective, taken from the same vantage point as FIG. 71, however with upper assembly 212 in its raised 214 disposition.

Figure 73:
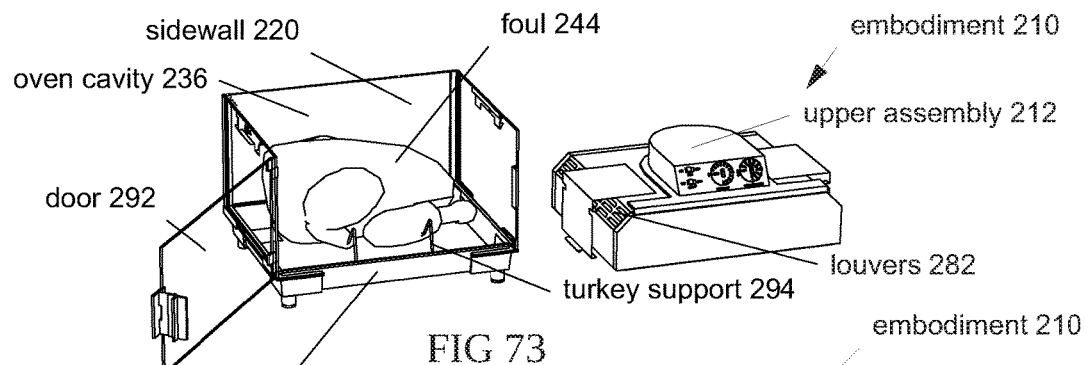

FIG. 73 is a perspective, taken from the same viewpoint as FIG. 71, however with upper assembly 212 removed from glass sidewalls 220.

Figure 74:
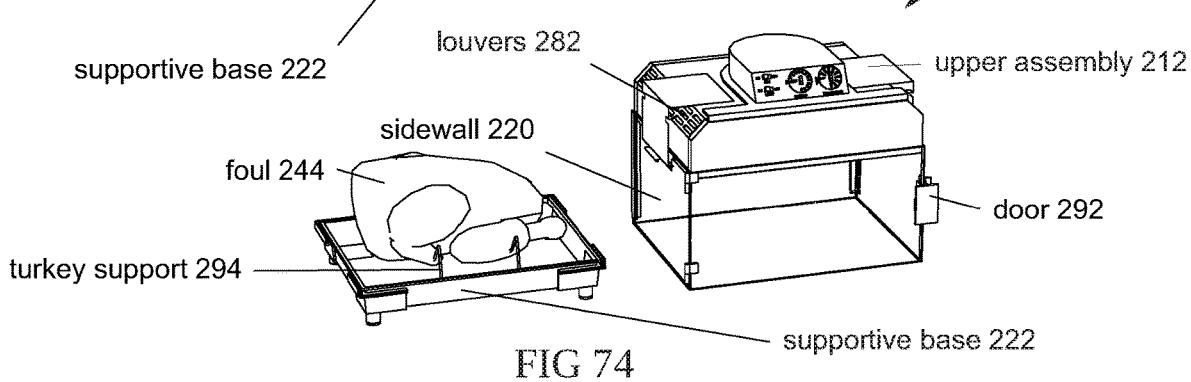

FIG. 74 is a perspective, taken from the same viewpoint as FIG. 71, however with both upper assembly 212 and glass sidewalls 220 removed from supportive base 222.

Figure 60:
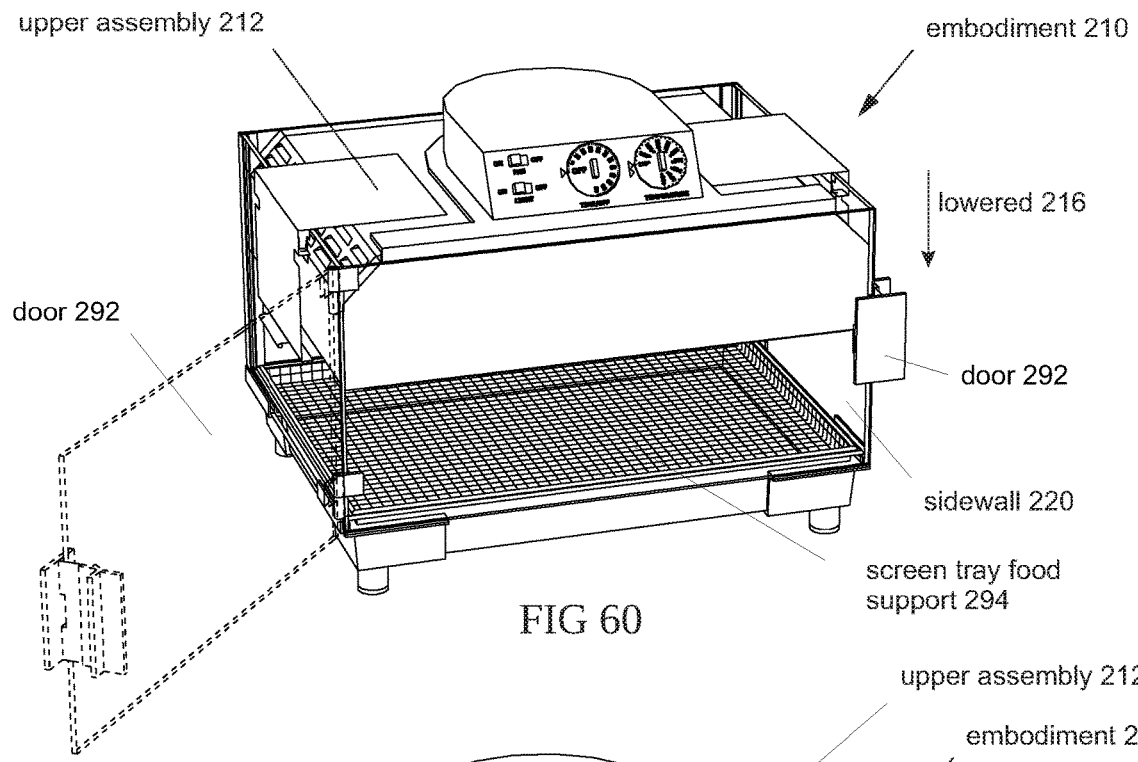
FIG. 60 is a perspective of embodiment 210 with upper assembly 212 lowered 216 to its lower position (FIG. 60). Embodiment 210, as can be readily seen, shares many features of earlier embodiments herein.
Figure 61:
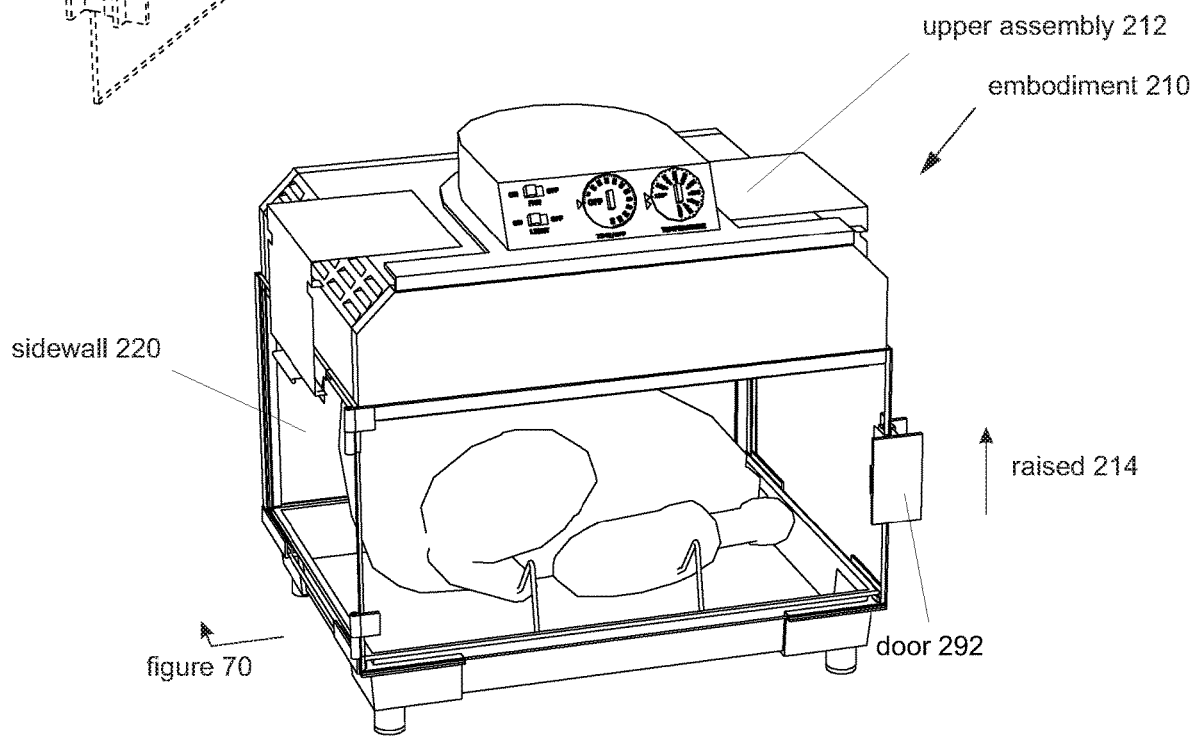
FIG. 61 is taken from the same perspective viewpoint as FIG. 60, however upper assembly 212 is raised 214 within sidewalls 220, to provide maximum oven cavity capacity.
Figure 62:
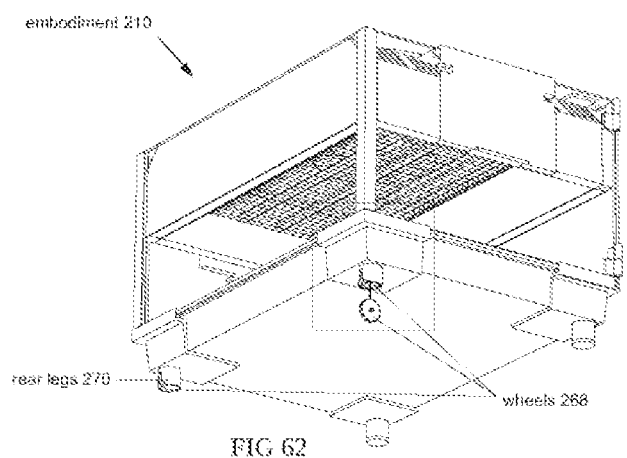
FIGS. 62 and 63 are perspectives of embodiment 210 with upper assembly 212 raised 214 to its upper position (FIG. 61) showing how wheels 268 are mounted into rear legs 270.
Figure 63:
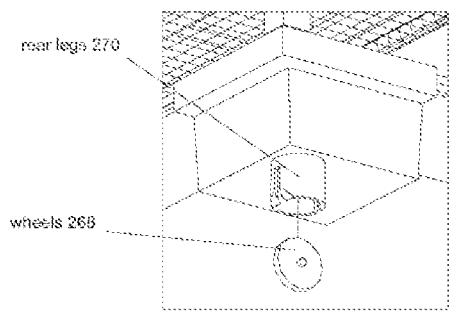
Figure 70:
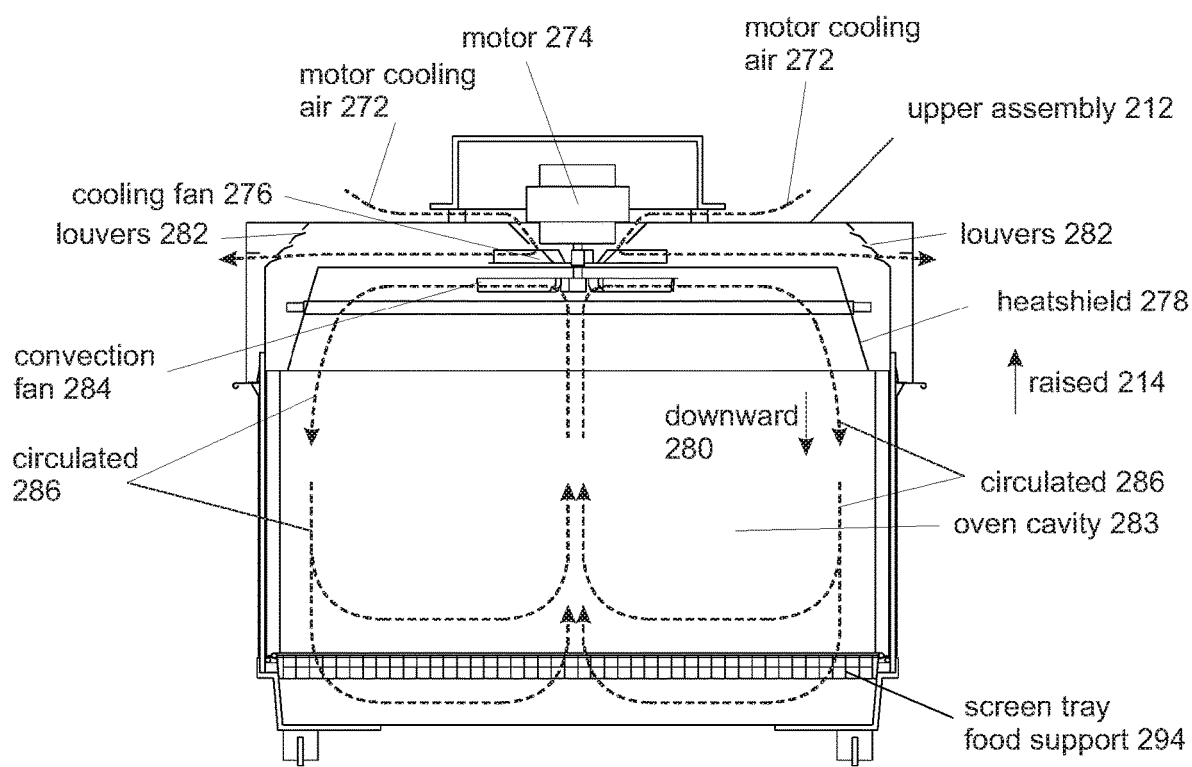
FIG. 70 is a cross-section of FIG. 61 as indicated in FIG. 61.
Figure 75:
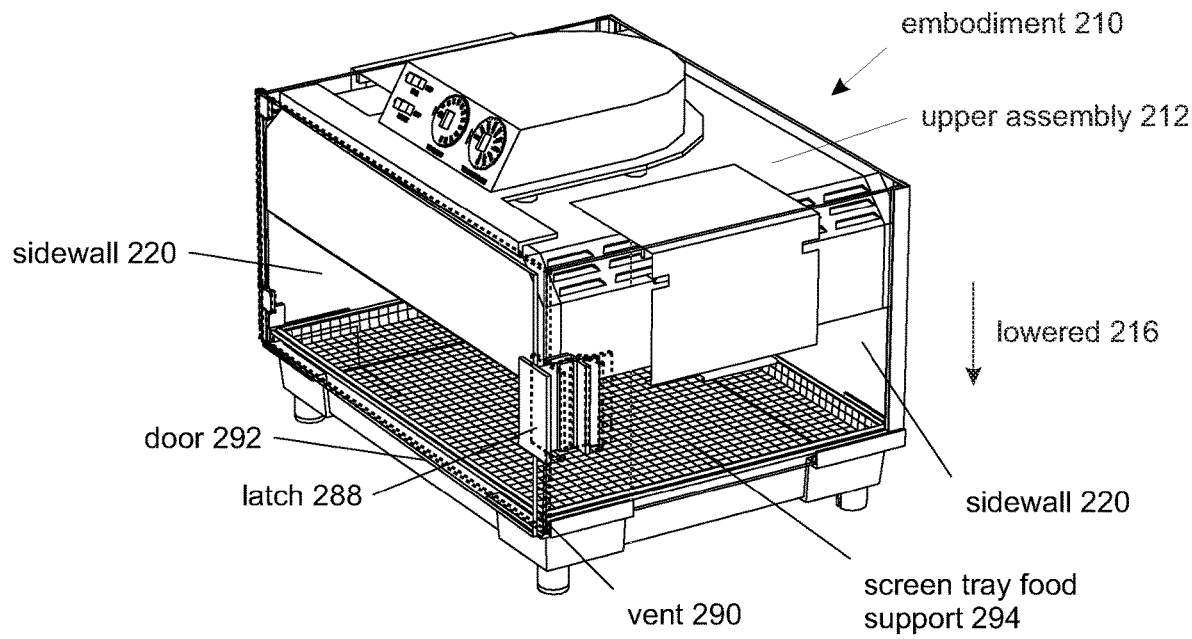
Figure 76:
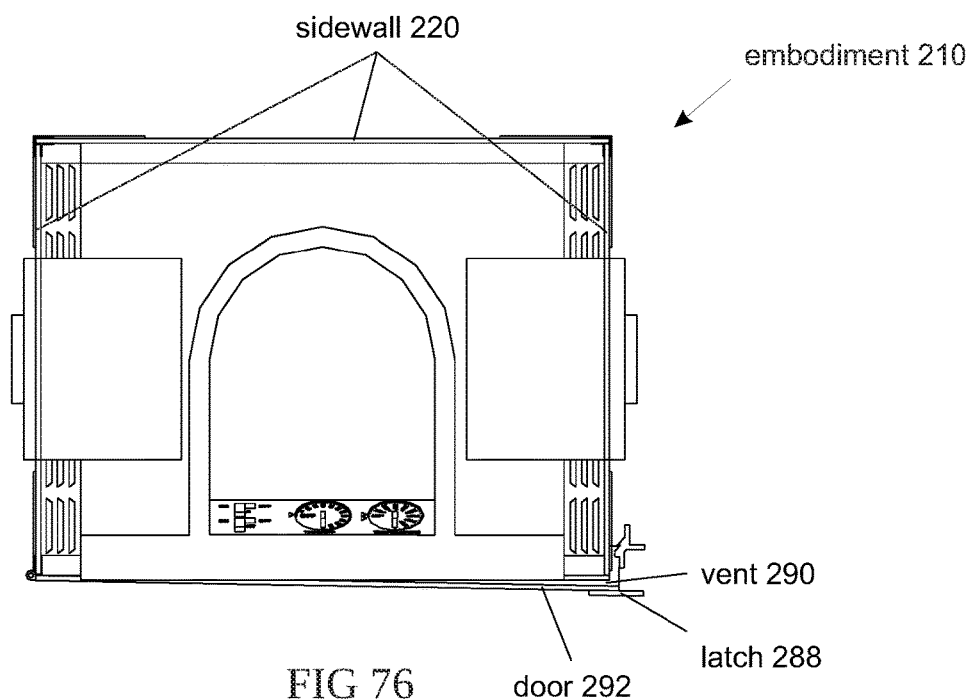

FIG. 75 is a perspective of embodiment 210 with upper assembly 212 and its lowered 216 disposition. User directed venting, to help crisp foods being cooked, is provided by latch 288 having 2 latching positions, a venting position as shown in FIGS. 75 and 76, where the vent 290 is created by not fully closing door 292; as well as a fully closed position, as shown in FIGS. 60 and 61. This venting allows hot moist air from within oven cavity 283 to be exchanged for dryer outside air, which in turn helps crisp foods being cooked.

FIG. 76 is a plan view of FIG. 75.

Figure 77:
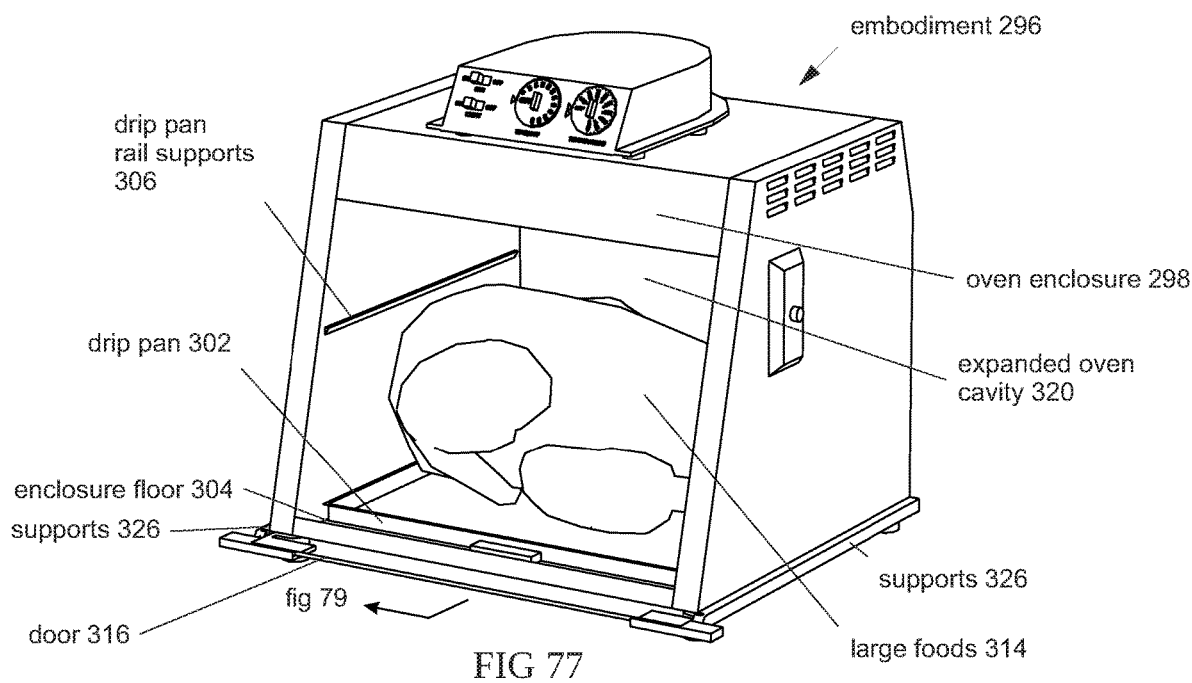

FIG. 77 is a perspective view of embodiment 296. Door 316 is shown open 318 (FIG. 79) and large food 314 is disposed in expanded oven cavity 320.

Figure 78:
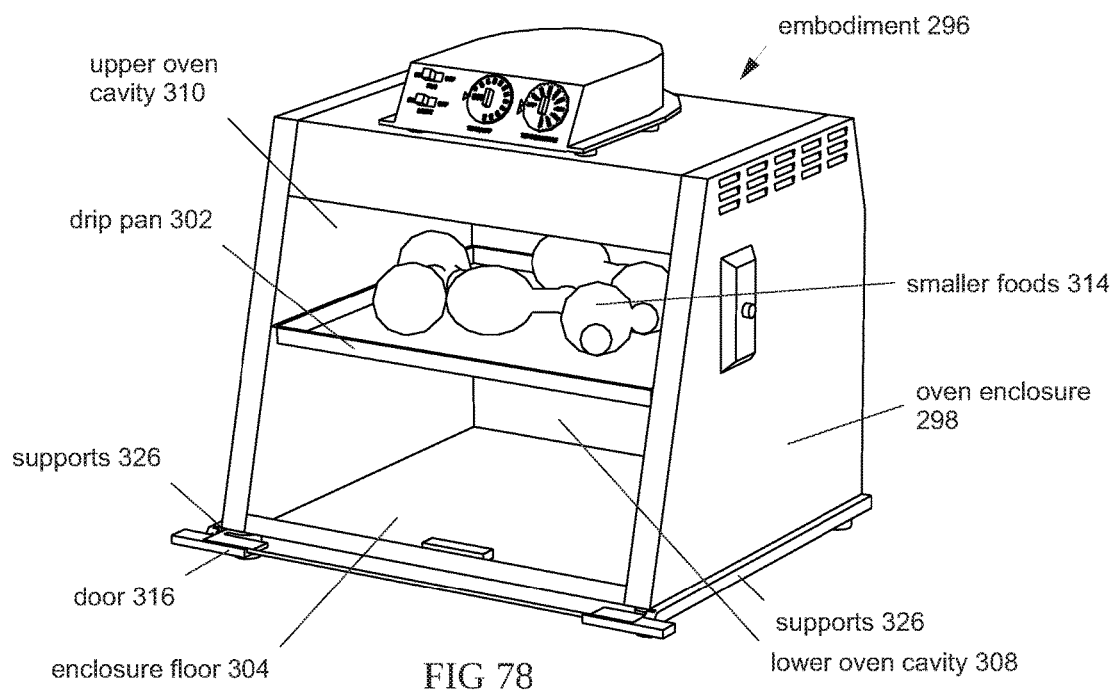

FIG. 78 is a perspective view of embodiment 296. Door 316 is shown open 318 (FIG. 79) and smaller foods 314 are shown resting on drip pan 302 within upper oven cavity 310.

Figure 79:
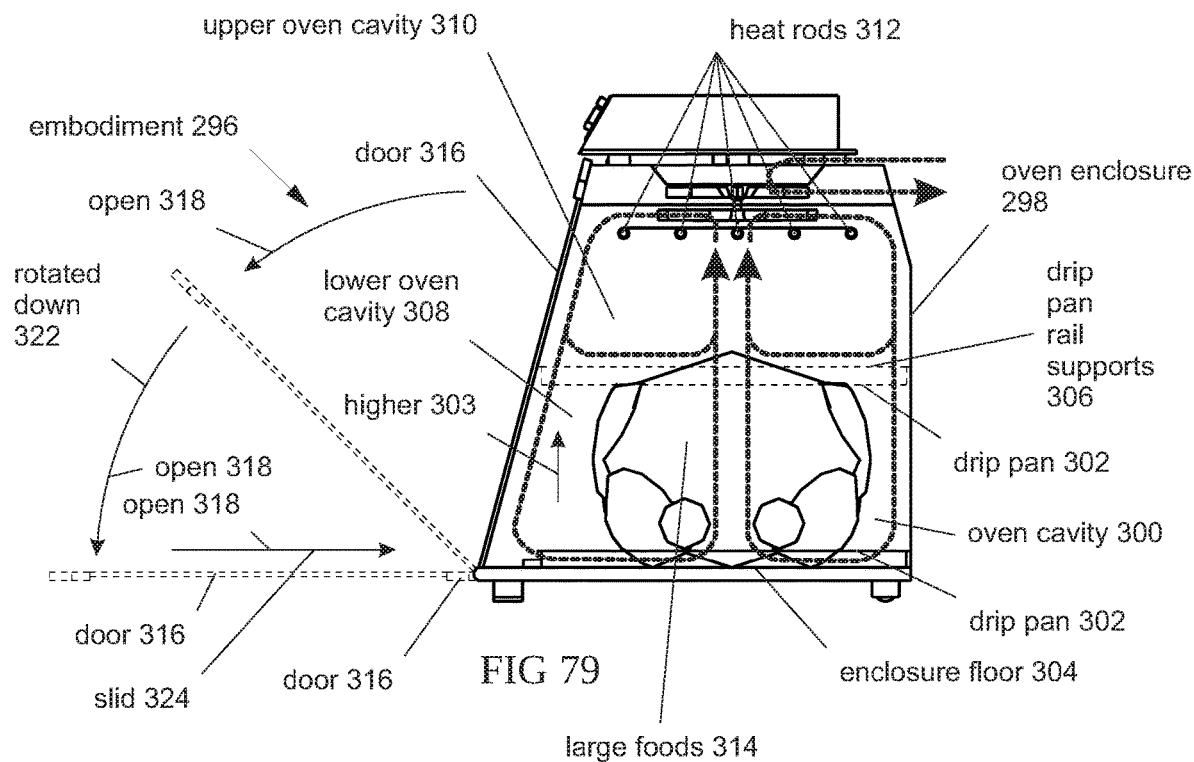

FIG. 79 is a cross-section of FIG. 77, as indicated in FIG. 77.

SUMMARY

Embodiments of the present application may have oven cavities with surrounding peripheral transparent sidewalls.

Embodiments of the present application may be configured to reduce and enlarge oven cavity volume by telescopically overlapping oven cavity sidewalls, including overlapping peripheral potentially transparent sidewalls, and moving them up and down relative to one another.

Embodiments of the present application may allow access to the oven cavity by separating an upper portion of the oven cavity from a lower portion of the oven cavity. This may be done by lifting the upper portion straight up and away from the lower portion. This may also be done by tilting the upper portion back and away from the lower portion along a common hinge axis. The upper portion may be held in this open position by gravity, by, when being lifted open, the entire upper portion traveling past its center of gravity point where the upper portion would fall back forward.

Embodiments of the present application may allow selective venting of the oven cavity to give foods a crisper bite.

Embodiments of the present application may support foods, including whole fowl, on an incline to promote more even cooking.

Embodiments of the present application may have wheels on their rear supports, which allow the embodiments to be easily pulled out like a drawer from a rear position on a countertop, to a more convenient forward use position on the countertop.

DETAILED DESCRIPTION

Figure 1:
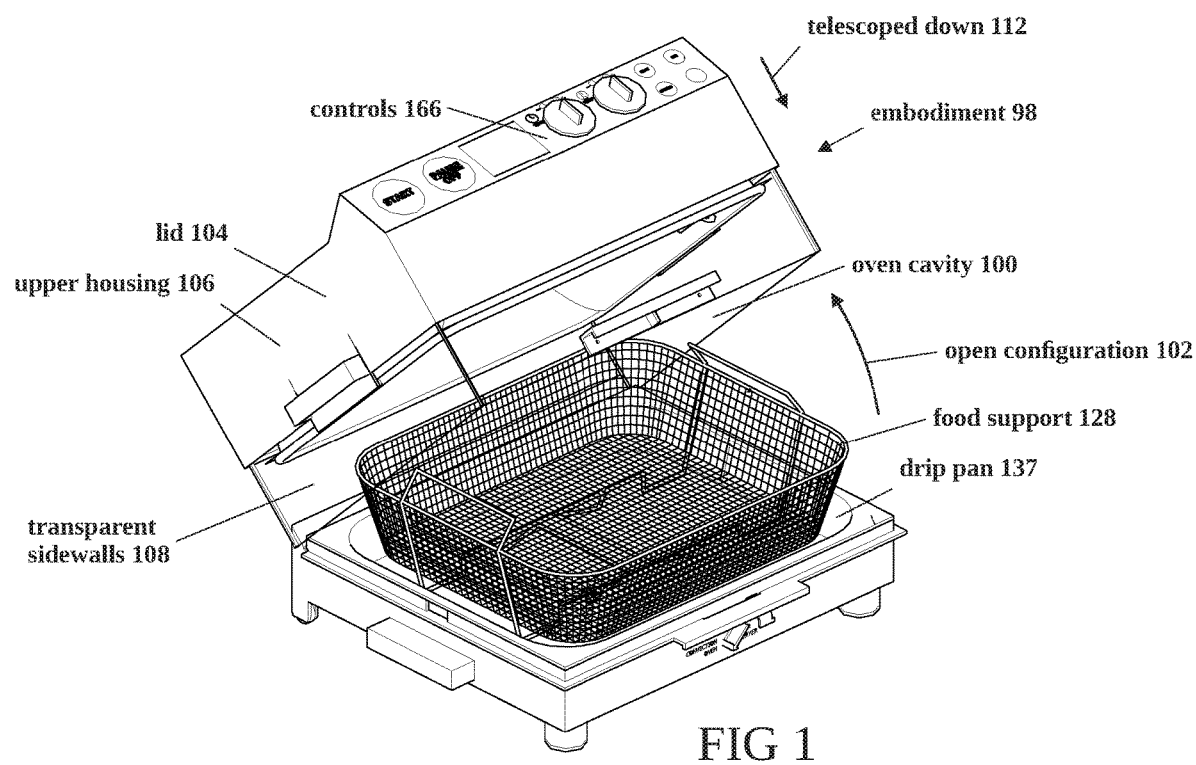
FIG. 1 is a frontal perspective of embodiment 98 of the subject application. Oven cavity 100 is shown in its open configuration 102, with lid 104, including upper housing 106 and transparent sidewalls 108, lifted 102 to its open configuration. Upper housing 106 is telescoped down 112 over transparent sidewalls 100 causing embodiment 98 to have minimal oven cavity volume.
Figure 2:
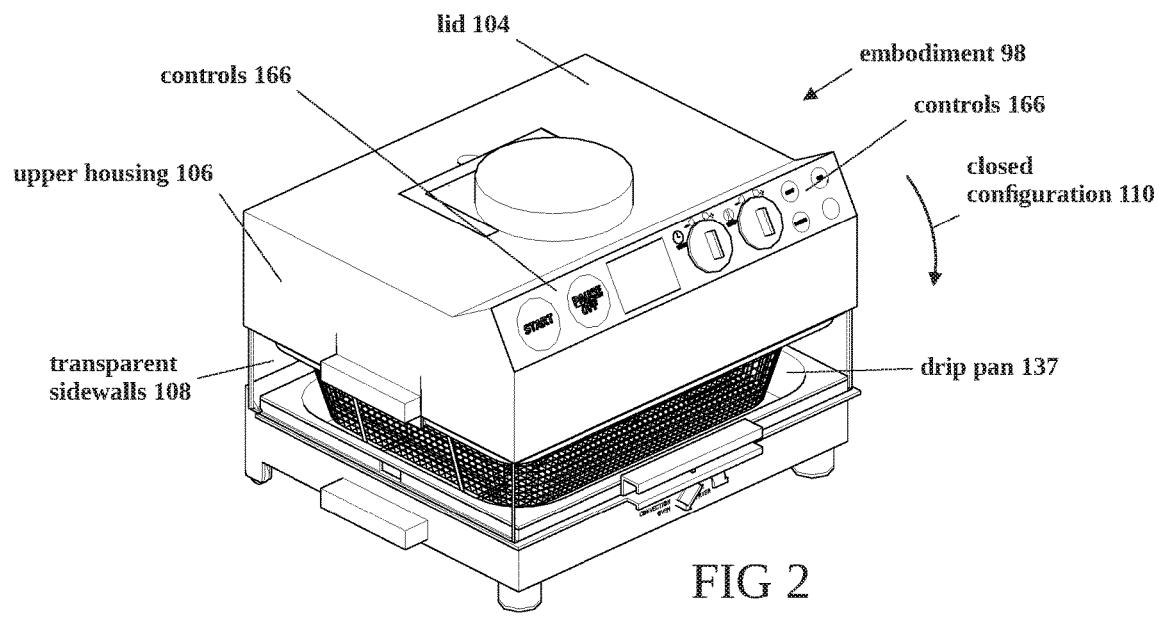
FIG. 2 is a frontal perspective taken from the same viewpoint as FIG. 1, but with embodiment 98 in closed configuration 110, with lid 104, including upper housing 106 and transparent sidewalls 108, lowered 110 to its closed configuration.

FIGS. 1 and 2 illustrate how embodiment 98 can be compacted to have minimal volume in its oven cavity 100, by upper housing 106 telescopically sliding down 112 over the outside of transparent sidewalls 108 to its lowest most position (FIG. 2). These figures also show that when embodiment 98 is so compacted, that it can be placed in an open configuration (FIG. 1), where food and other articles can be placed in, or removed from, oven cavity 100; and that embodiment 98 can be placed configured to be closed (FIG. 2), where oven cavity 100 is generally fully enclosed.

Figure 3:
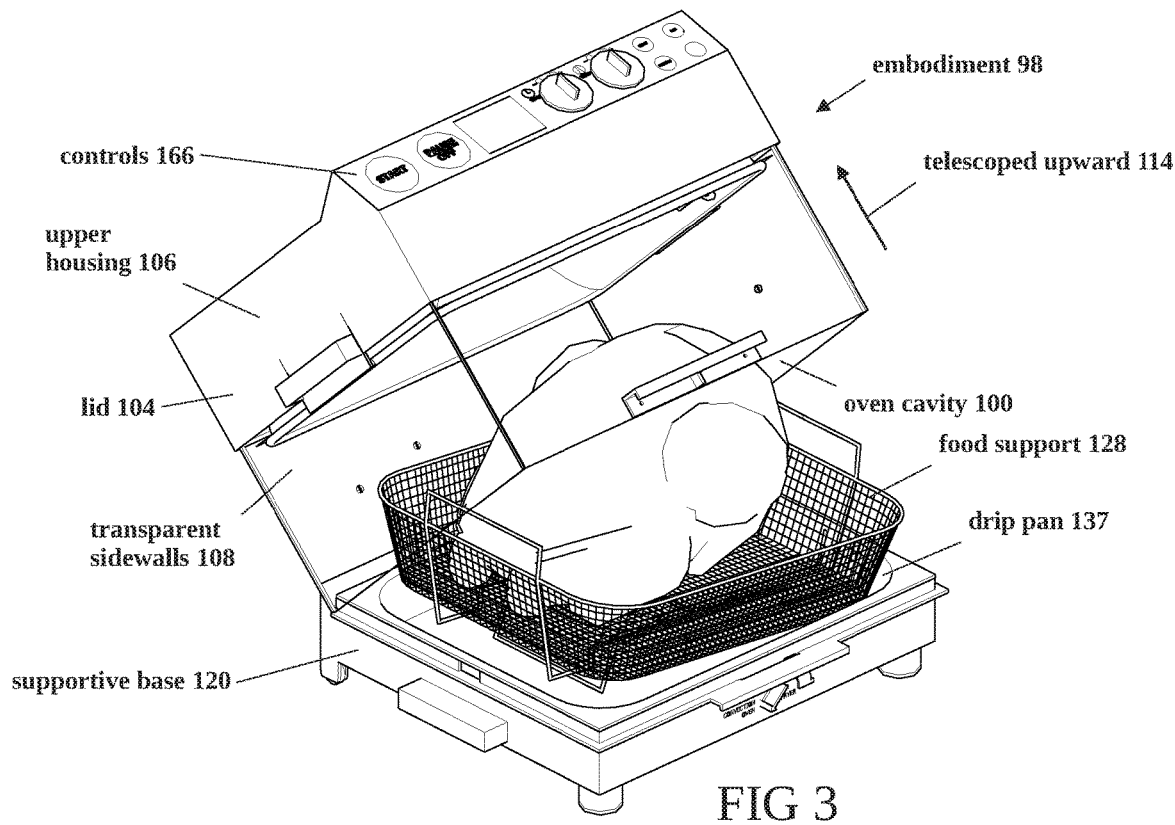
FIG. 3 is the same as FIG. 1 except upper housing 106 is telescoped upward 114 over transparent sidewalls 100 relative to FIG. 1, thus causing embodiment 98 to have maximum oven cavity volume.
Figure 4:
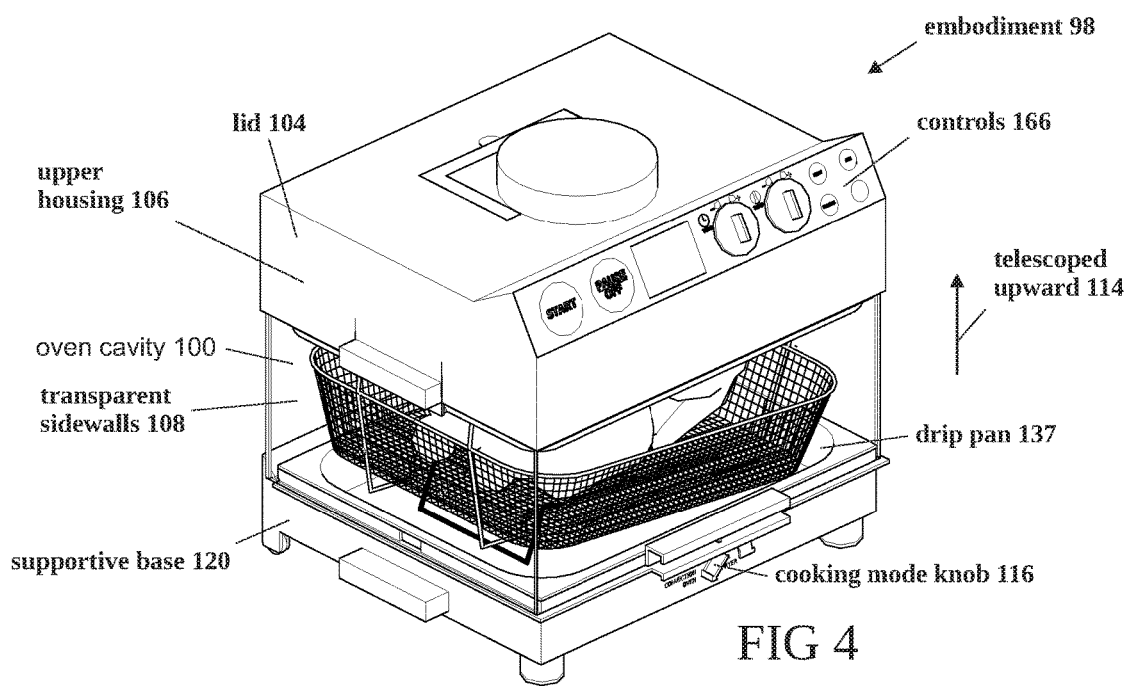
FIG. 4 is the same as FIG. 2, except upper housing 106 is telescoped upward 114 over transparent sidewalls 100 relative to FIG. 1, thus causing embodiment 98 to have maximum oven cavity volume.

FIGS. 3 and 4 likewise show embodiment 98 in its open (FIG. 3) and closed (FIG. 4) configurations, but with oven cavity 100 expanded to its maximum volume by raising upper housing 106 upward to its highest position (FIG. 4) relative to transparent sidewalls 108.

As mentioned earlier, contracting the volume of oven cavity 100 (FIGS. 1 and 2), allows for faster warm-up times, and thus reduced overall cooking times, for foods within oven cavity 100. However, contracting the volume of oven cavity 100, decreases its food handling capacity.

Expanding oven cavity 100 (FIGS. 3 and 4) increases its food handling capacity, but increases warm-up times, and thus increases overall cooking times.

Figure 5:
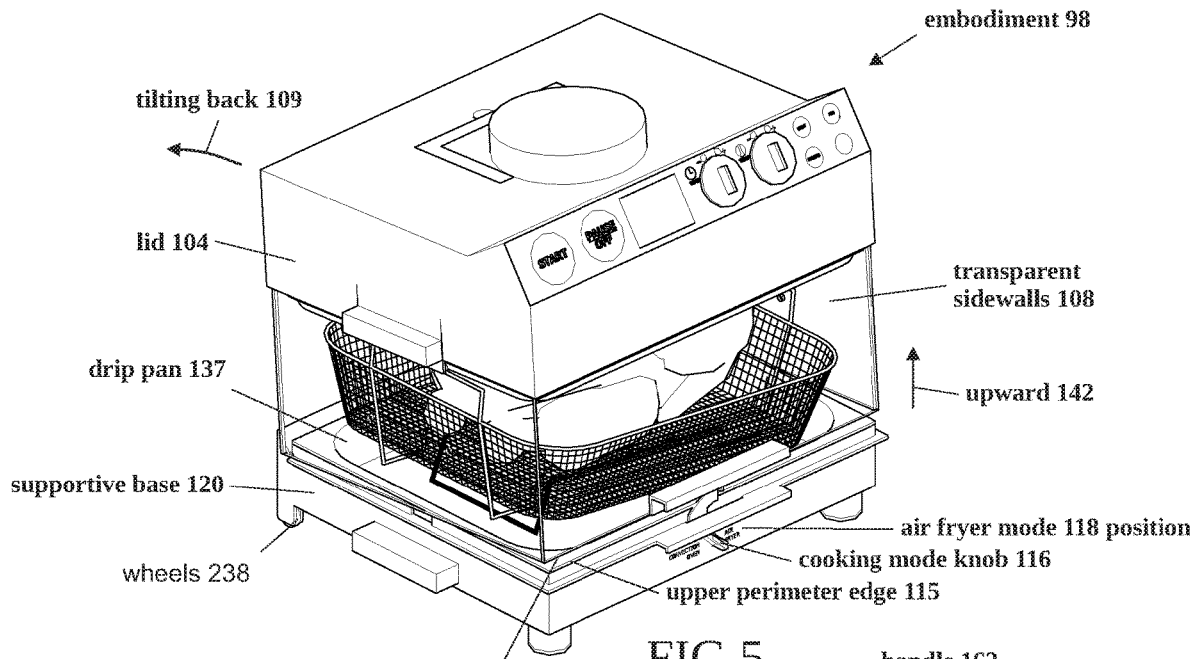
FIG. 5 is the same as FIG. 4 except cooking mode knob 116 is set to its air fryer mode 118 where it raises lid 104 to allow venting along the lower perimeter edge of lid 104.
Figure 49:
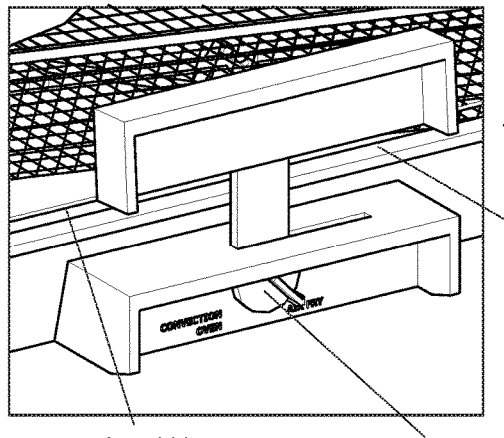
FIG. 49 is a detail of FIG. 43, as indicated in FIG. 43.
Figure 50:
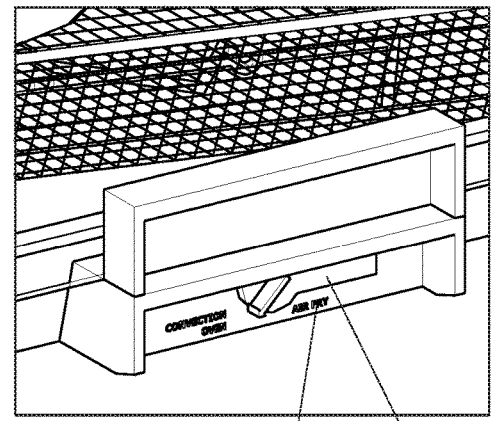
FIG. 50 is a detail of FIG. 44, as indicated in FIG. 44.
Figure 51:
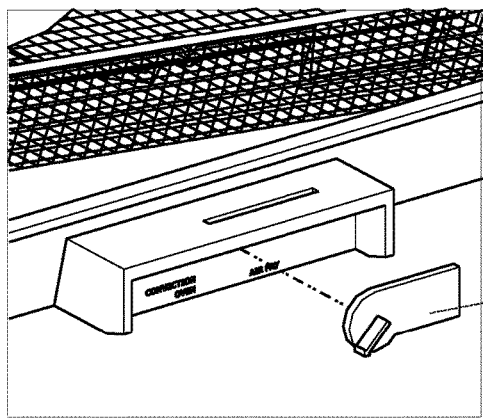
FIG. 51 is an exploded view of FIG. 50.
Figure 52:
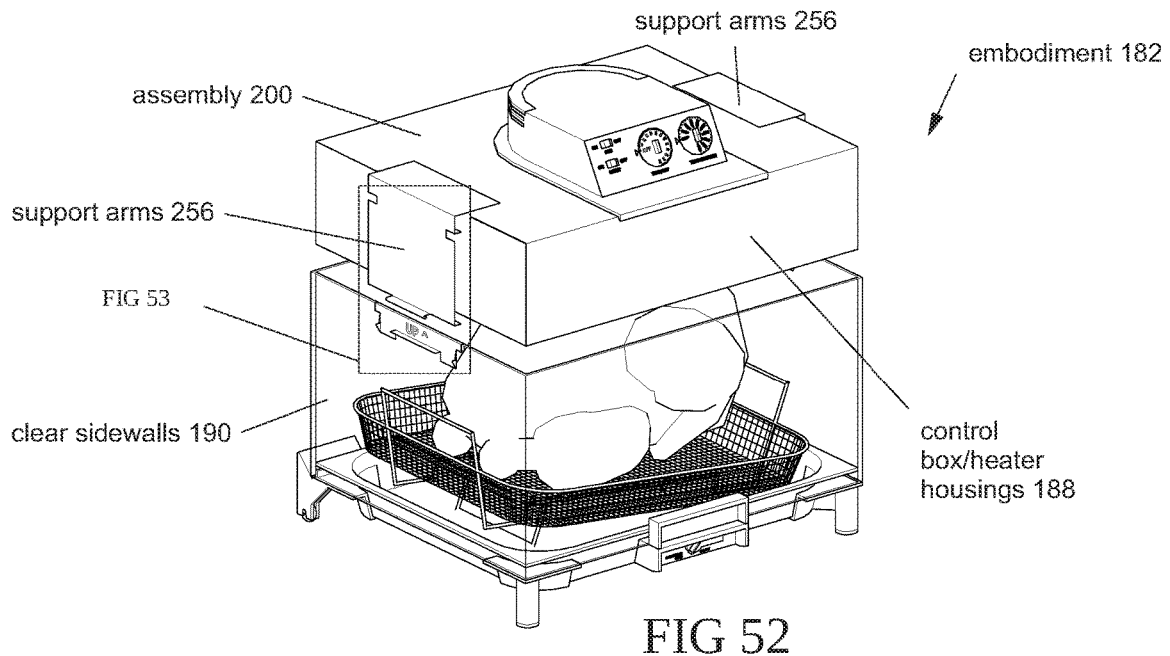
FIG. 52 is taken from the same viewpoint as FIG. 44, but with assembly 200 lifted and held above clear sidewalls 190.
Figure 53:
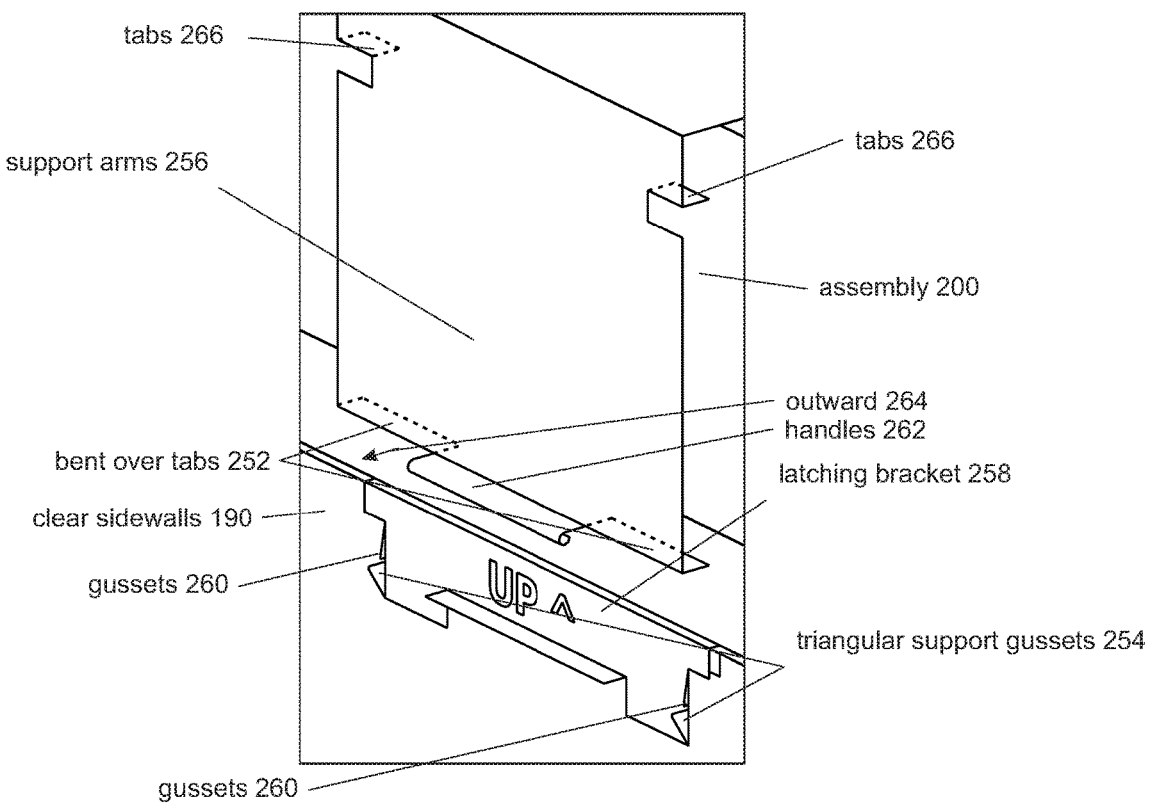
FIG. 53 is a detail of FIG. 52, as indicated in FIG. 52.
Figure 54:
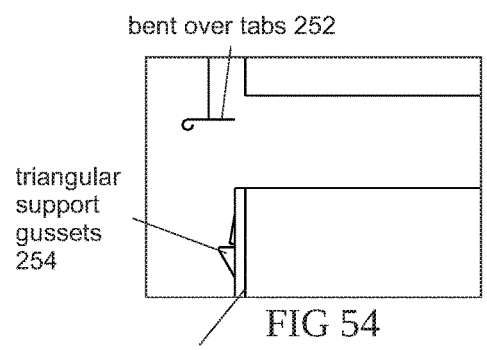
FIG. 54 is a detail of FIG. 57, as indicated in FIG. 57.
Figure 55:
FIG. 55 is a detail of FIG. 58, as indicated in FIG. 58.
Figure 56:
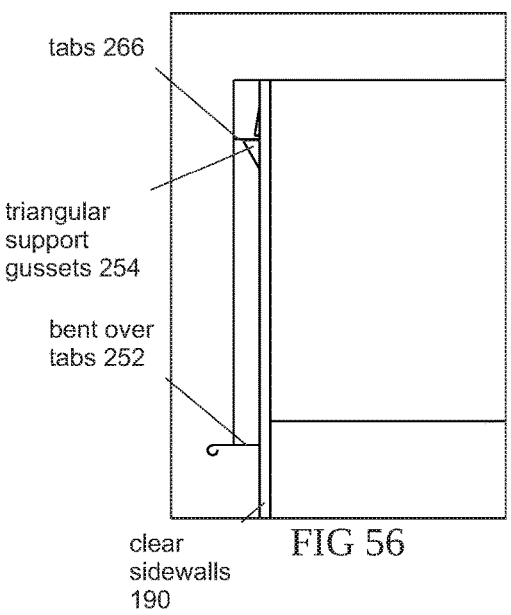
FIG. 56 is a detail of FIG. 59, as indicated in FIG. 59.
Figure 57:
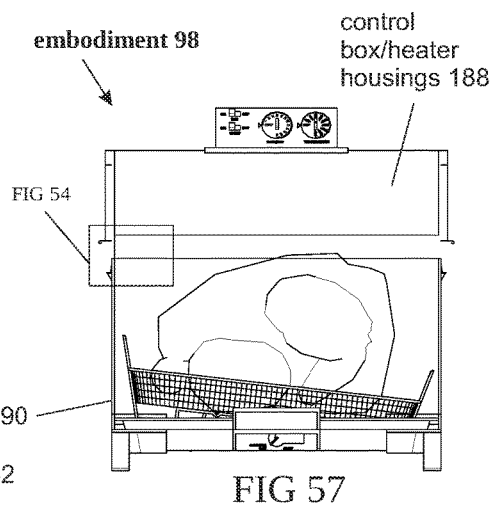
FIG. 57 is a frontal view of FIG. 52.
Figure 58:
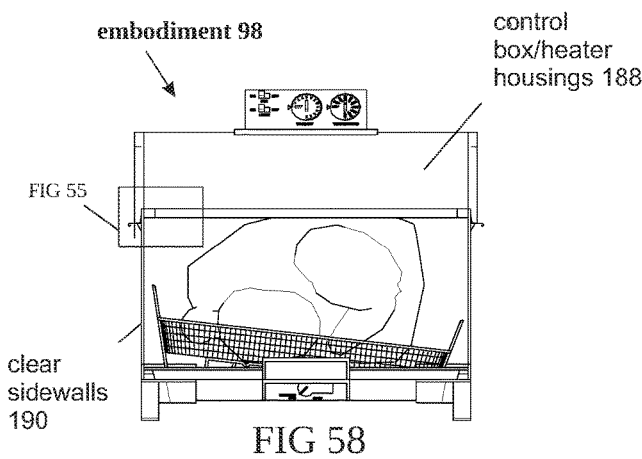
FIG. 58 is taken from the same viewpoint as FIG. 57, however, control box/heater housing 188 has been partially lowered into clear sidewalls 190 in an upper position, making oven cavity 184 maximized in volume.

FIGS. 5, 43, 44, and 49-51 show a means of selectively venting oven cavity 100, to increase food crispness. This may be done by tilting back 109 lid 104 (FIG. 5), as well as attached transparent sidewalls 108, to where the lower perimeter edge 111 of transparent sidewalls 108 is separated upward from the upper perimeter edge 115 of supportive base 120. This tilting back 109 may be accomplished by adjusting cooking mode knob 116 to its air fryer mode 118 position (FIGS. 5 and 49), which in turn props the lower perimeter edge 111 upward 142 and away from upper perimeter edge 115 of supportive base 120 (FIGS. 5 and 49). This may be done with lid 104 either in its oven cavity volume maximizing disposition (FIGS. 3 and 4), or may be done with lid 104 in its oven cavity volume minimizing disposition (FIGS. 1 and 2).

Such venting may be accomplished in many other ways. As non-limiting and non-exhaustive examples, a potbelly stove type rotary or sliding flew vent might be placed on a peripheral wall of the oven cavity.

Figure 6:
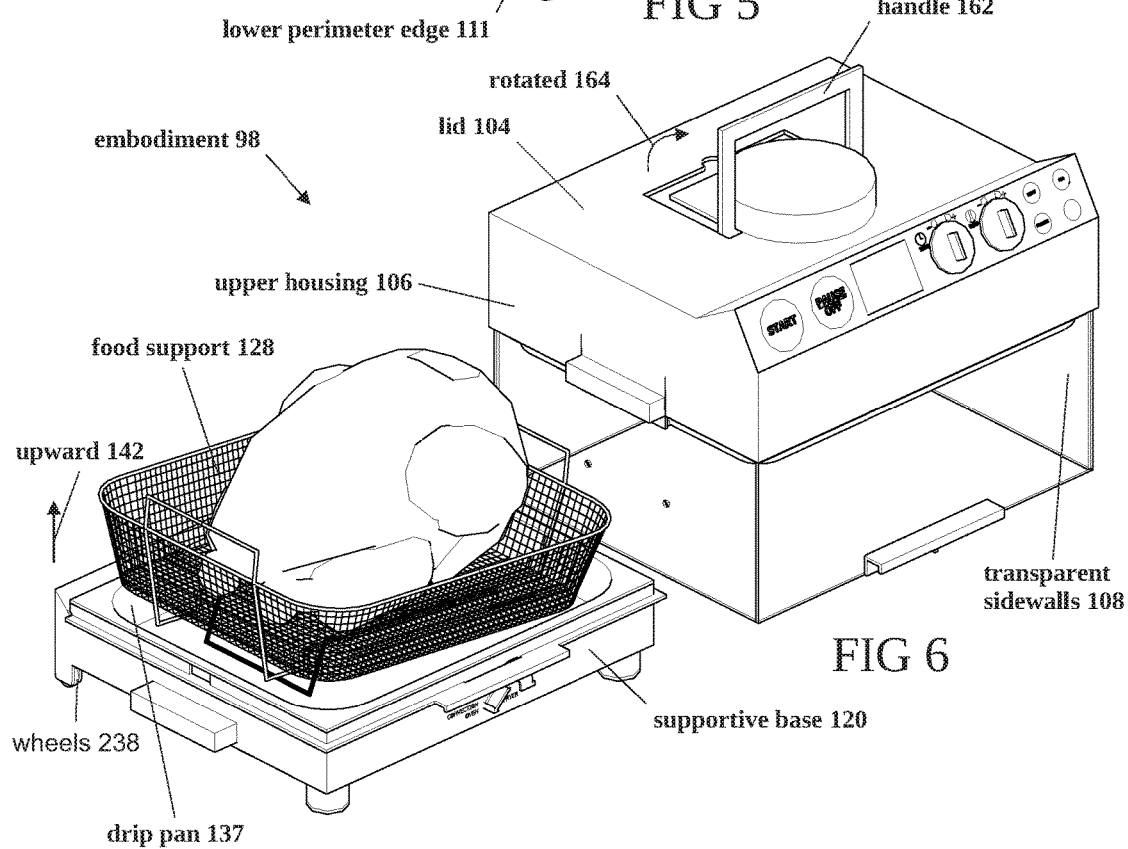
FIG. 6 is the same as FIG. 4 except lid 104, including housing 106 and sidewalls 108, are removed from supportive base 120.

In FIG. 6, lid 104, including upper housing 106 and transparent sidewalls 108, is removed from supportive base 120. This may be accomplished by lifting lid 104 and accompanying items (106 and 108) upward 142 (FIG. 6) and away from supportive base 120. This may be aided by handle 162 being rotated 164 upward (FIG. 6) to help in manual lifting. In turn, this may be done with lid 104 either in its oven cavity volume maximizing disposition (FIGS. 3 and 4), or may be done with lid 104 in its oven cavity volume minimizing disposition (FIGS. 1 and 2).

Allowing full removal of lid 104 from support base 120 (FIG. 6), conveniently allows full access to oven cavity 100, without any interference from lid 104 and/or associated components.

Figure 7:
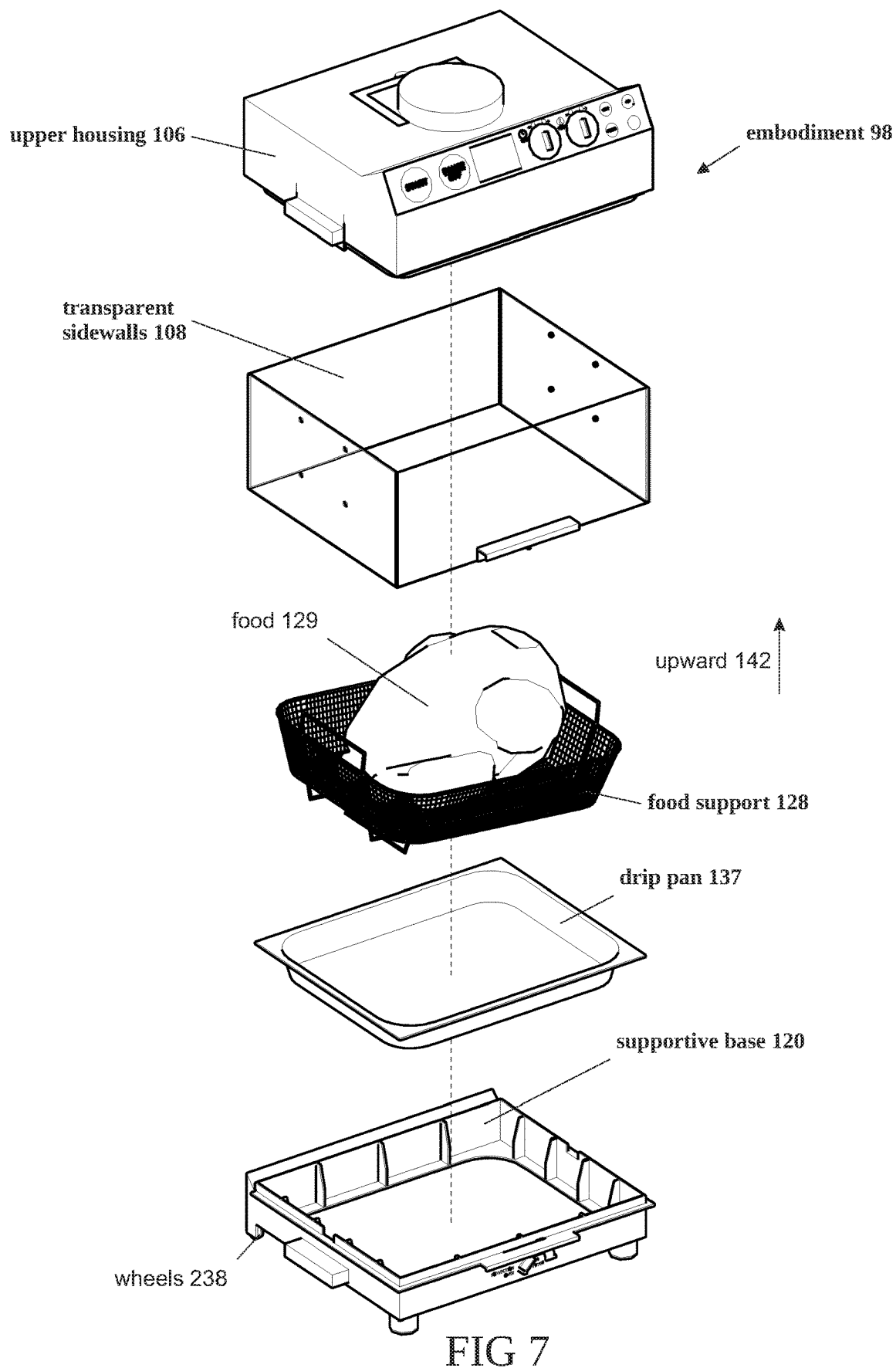
FIG. 7 is a frontal exploded perspective of embodiment 98.

FIG. 7 shows an exploded assembly of embodiment 98 from an upper forward perspective vantage point. Upper housing 106 may be telescoped onto transparent sidewalls 108. Transparent sidewalls 108 in turn may stack on top of supportive base 120 and may be parted from base 120 by lifting it straight upward 142 or by tilting it back 109 (FIG. 5). Supportive base 120, in turn, may mount drip pan 137, which in turn may support food support 128 and food 129 contained within.

Figure 8:
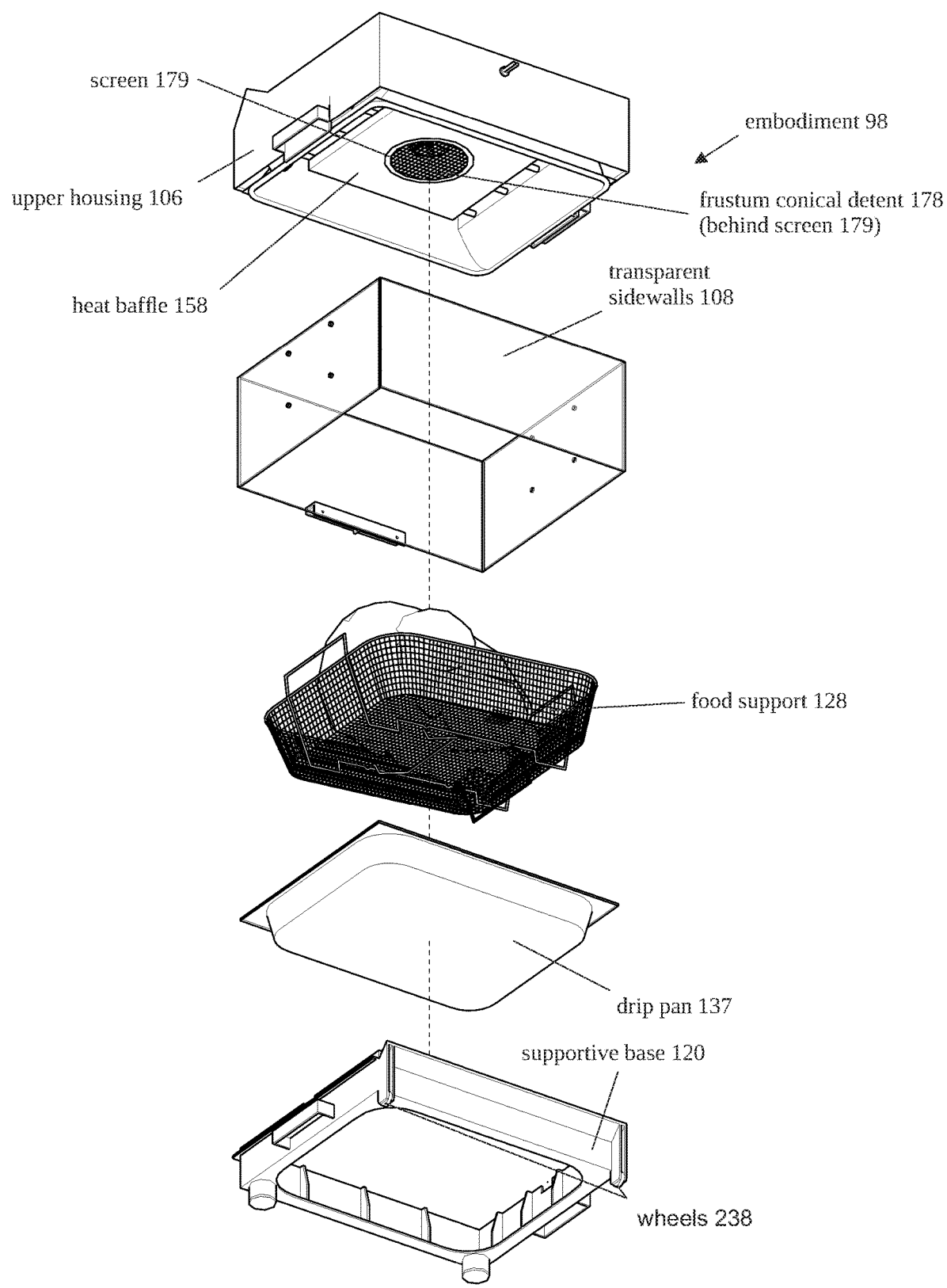
FIG. 8 is a lower rear exploded perspective of embodiment 98.
Figure 15:
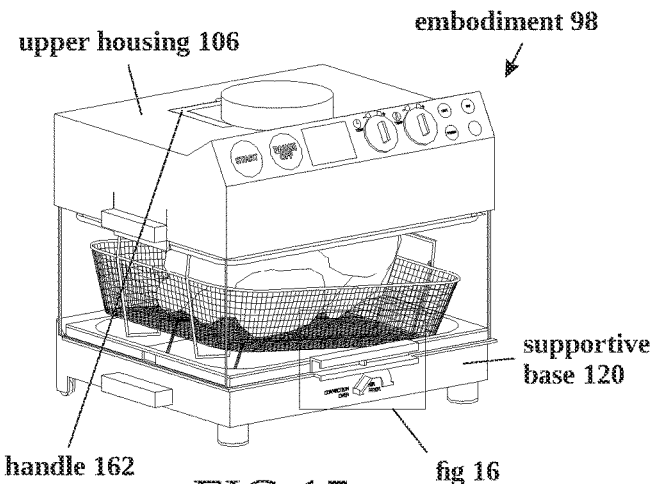
FIG. 15 is similar to FIG. 4 except indicating the location of detail, FIG. 16.
Figure 16:
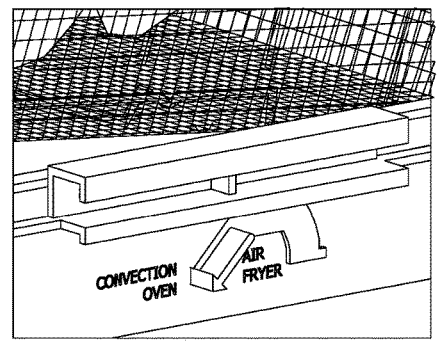
FIG. 16 is a detail on FIG. 15 as indicated in FIG. 15.
Figure 17:
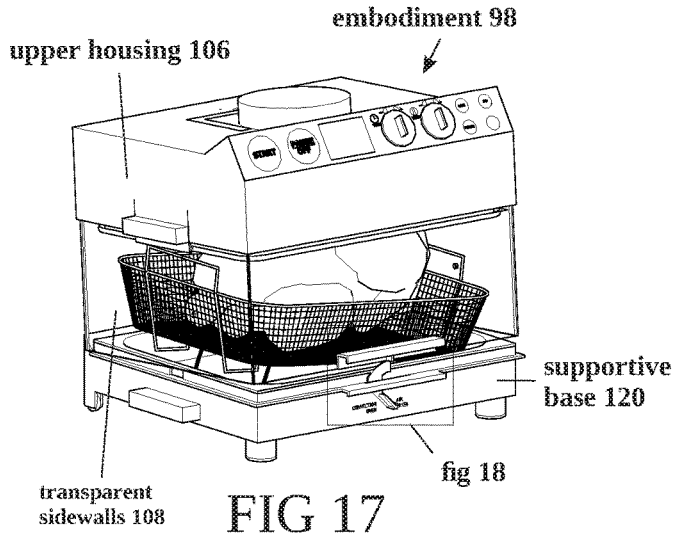
FIG. 17 is similar to FIG. 5 except indicating the location of detail, FIG. 18.
Figure 18:
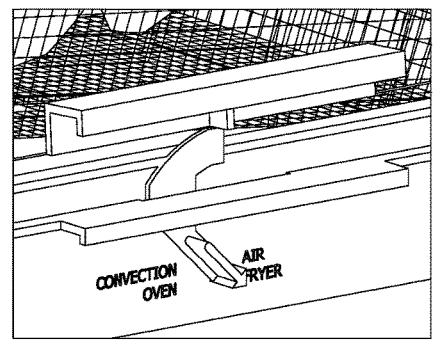
FIG. 18 is a detail of FIG. 17, as indicated in FIG. 17.
Figure 19:
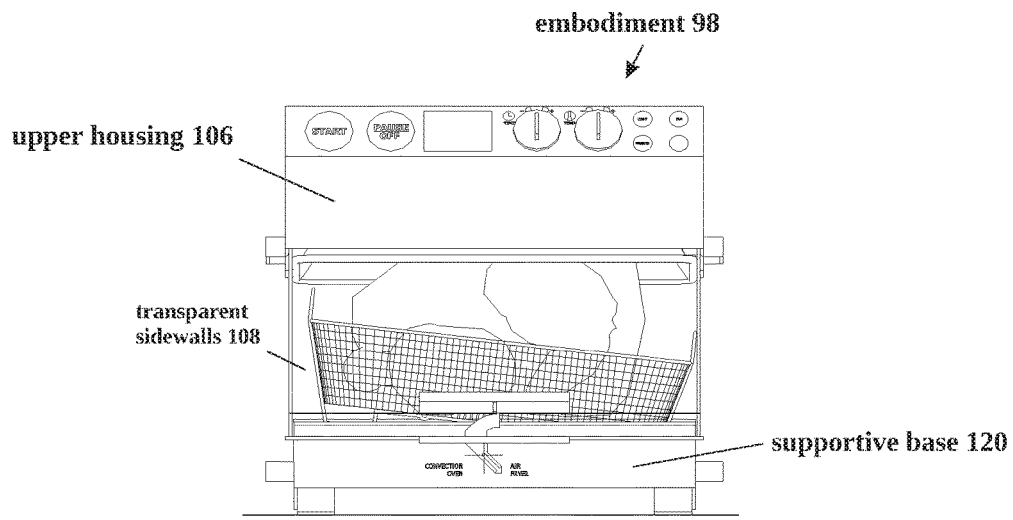
FIG. 19 is a frontal view of FIG. 17.

FIG. 8 shows the same items as FIG. 7, except taken from a low rear perspective.

FIG. 9 shows lid 104, including attached transparent sidewalls 108, from a low, forward perspective. This viewpoint allows viewing reflector 144, which mounts heat rods 148 using holes 146 (FIG. 10).

FIG. 9 also shows heat baffle 158, which removably snaps onto, and below, heat rods 148. Heat baffle 158 centrally includes screened over fan intake 160. Heat baffle 158 may block radiant heat from heat rods 148 from overcooking upper surfaces of foods being cooked. Removal of heat baffle 158 permits cleaning as well as broiling of foods.

FIG. 10 is an exploded perspective view of FIG. 9. FIG. 10 shows handle 162 which may be rotated 164 upward (FIG. 6) to facilitate lifting lid 104 off from support base 120, for making oven cavity access easier, or for other purposes.

Handle 162 is rotatably mounted 164 to upper housing 106 which mounts controls 166 which are disposed facing diagonally upward to enhance ergonomics, visibility, and accessibility.

Upper housing 106 also mounts motor 168 (FIGS. 10, 36 and 37) which fixedly attaches, on upper motor vertical shaft end 174 (FIG. 37), cooling fan 170; and motor 168 fixedly attaches on lower vertical shaft end 176 (FIG. 37), convection fan 172.

Figure 36:
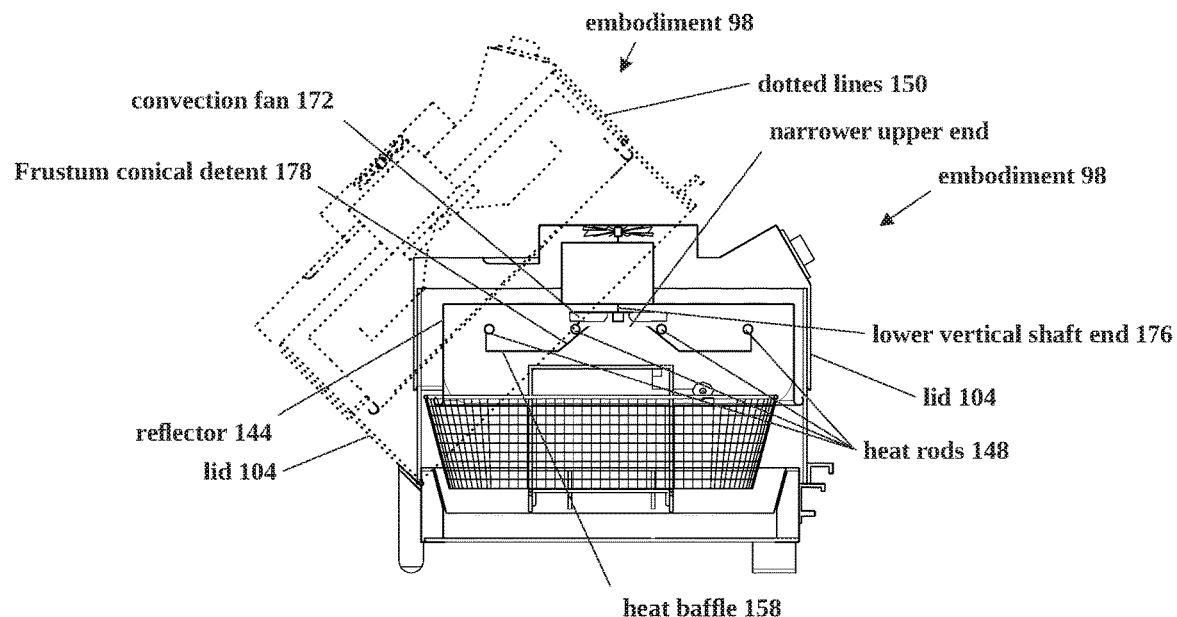
FIG. 36 is a section through FIG. 31, as indicated in FIG. 31. Dotted lines 150 show lid 104 in its tilted back, open position for accessing oven cavity 226.
Figure 37:
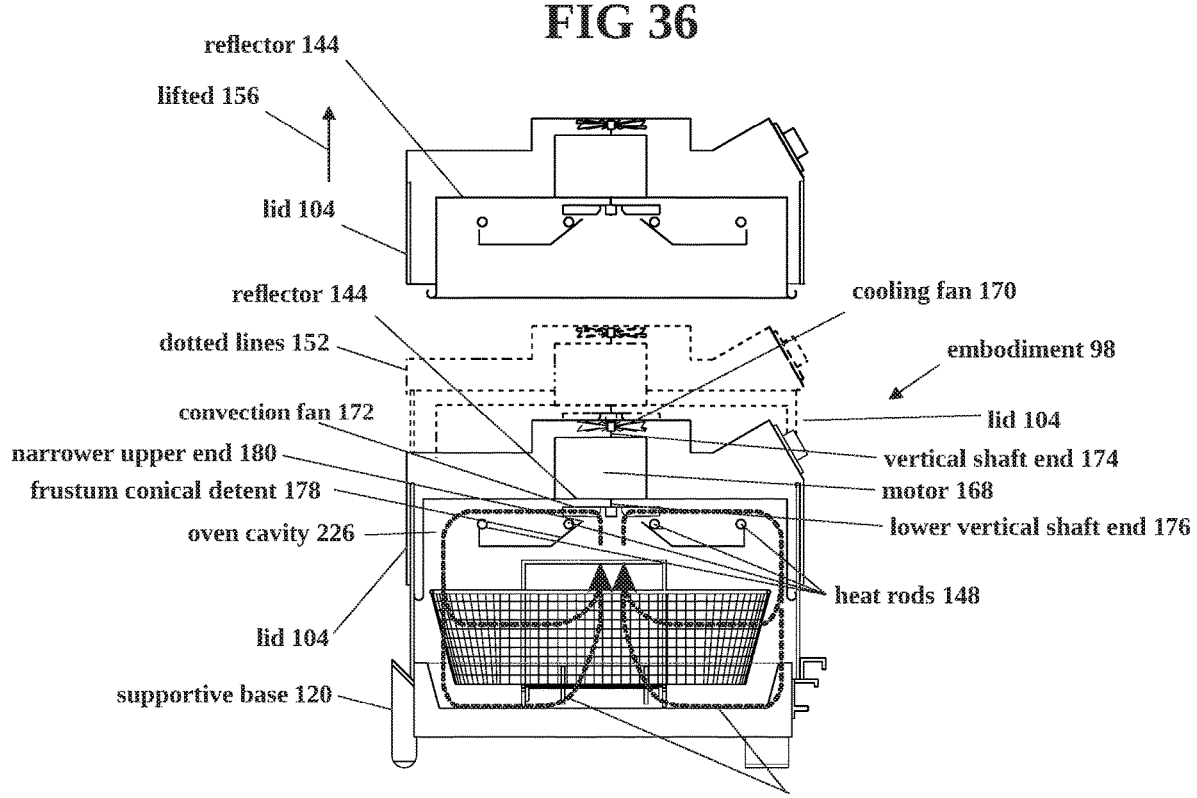
FIG. 37 is a section through FIG. 31, as indicated in FIG. 31. Dotted lines 152 show lid 104 in its position for maximum oven cavity volume.
Figures 42, 43:
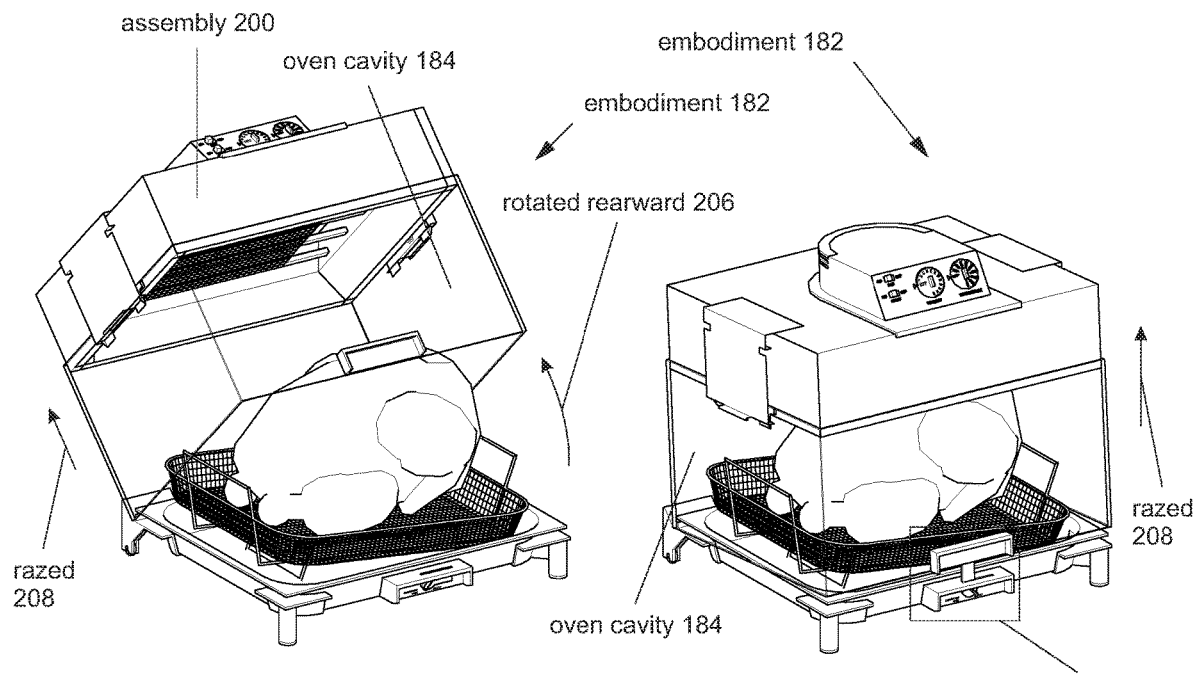
FIG. 42 is taken from the same viewpoint as FIG. 41, however instead of assembly 200 being lifted 204 and removed from supportive base 202 (FIG. 41), assembly 200 is rotated rearward 206, providing access to oven cavity 184.
FIG. 43 is taken from the same viewpoint as FIG. 42, however oven cavity 184, in its maximum volume configuration, is vented by assembly 200 being tilted rearward 208 (FIG. 42) by rotating lever 194 being rotated 198 (FIG. 40) which in turn causes assembly 202 rotate rearward 206, and provide an opening for controlled venting.
Figure 44:
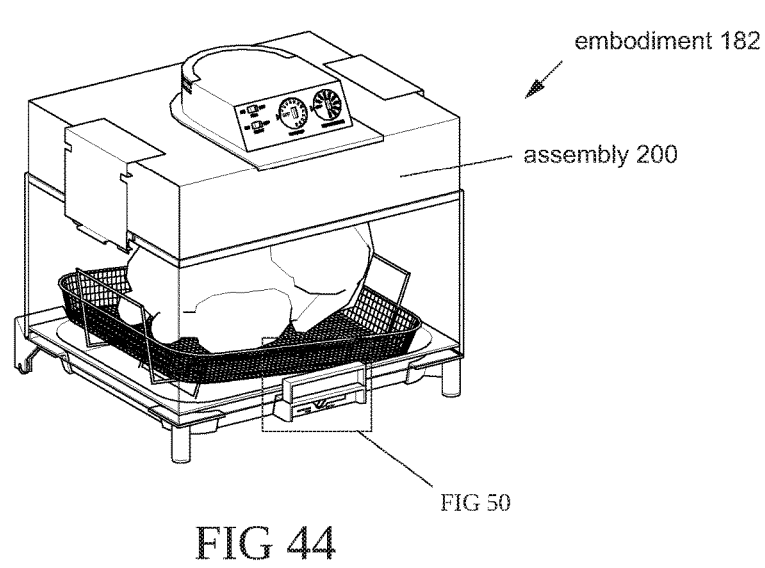
FIG. 44 is taken from the same viewpoint as FIG. 43, however, assembly 200 has been tilted lower thus fully enclosing oven cavity 184.
Figure 45:
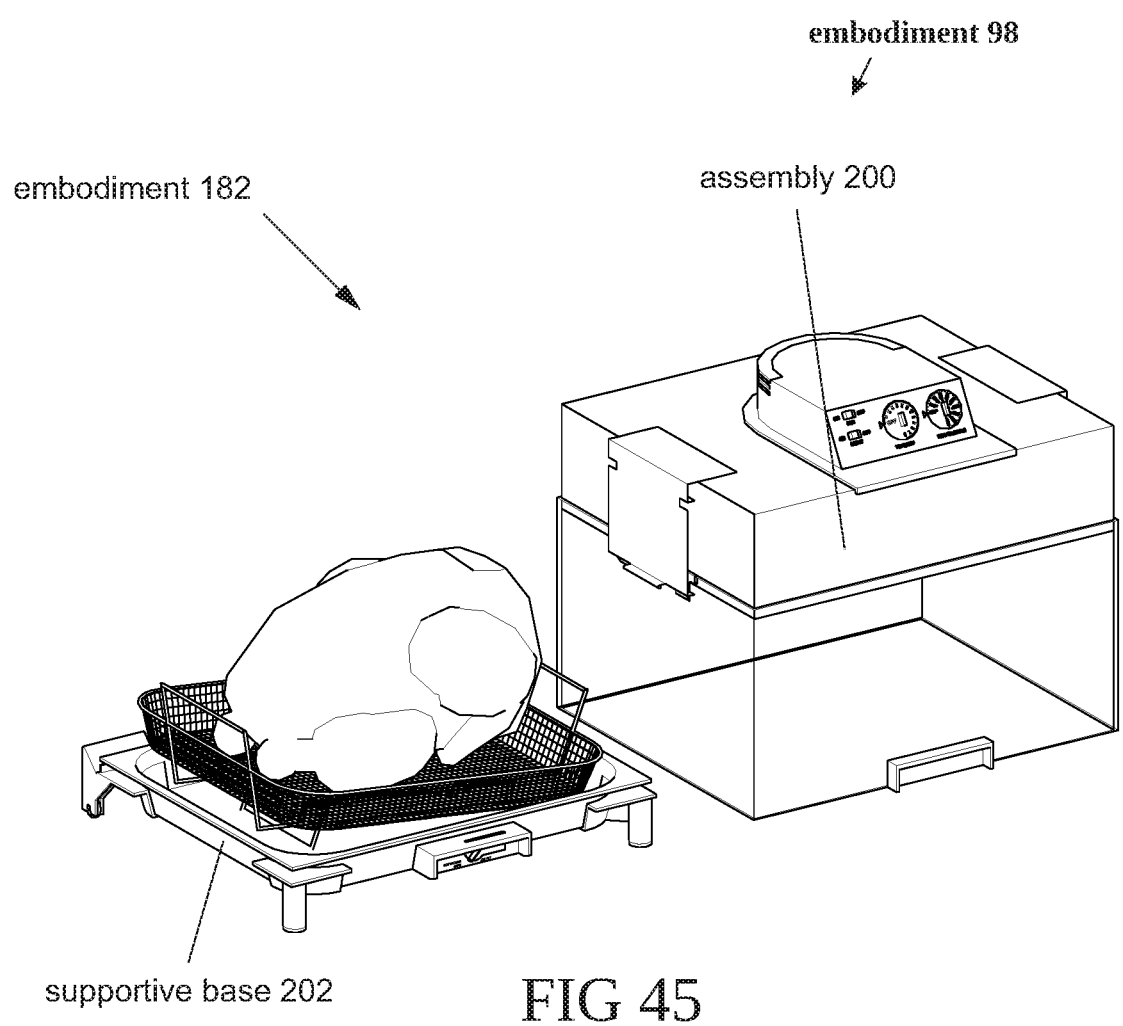
FIG. 45 is taken from the same viewpoint as FIG. 44, however, assembly 200 has been manually lifted 204 (FIG. 41) and removed from supportive base 202 as with FIG. 41, this allows open access to supportive base 202 for food loading, cleaning or for other purposes.
Figure 46:
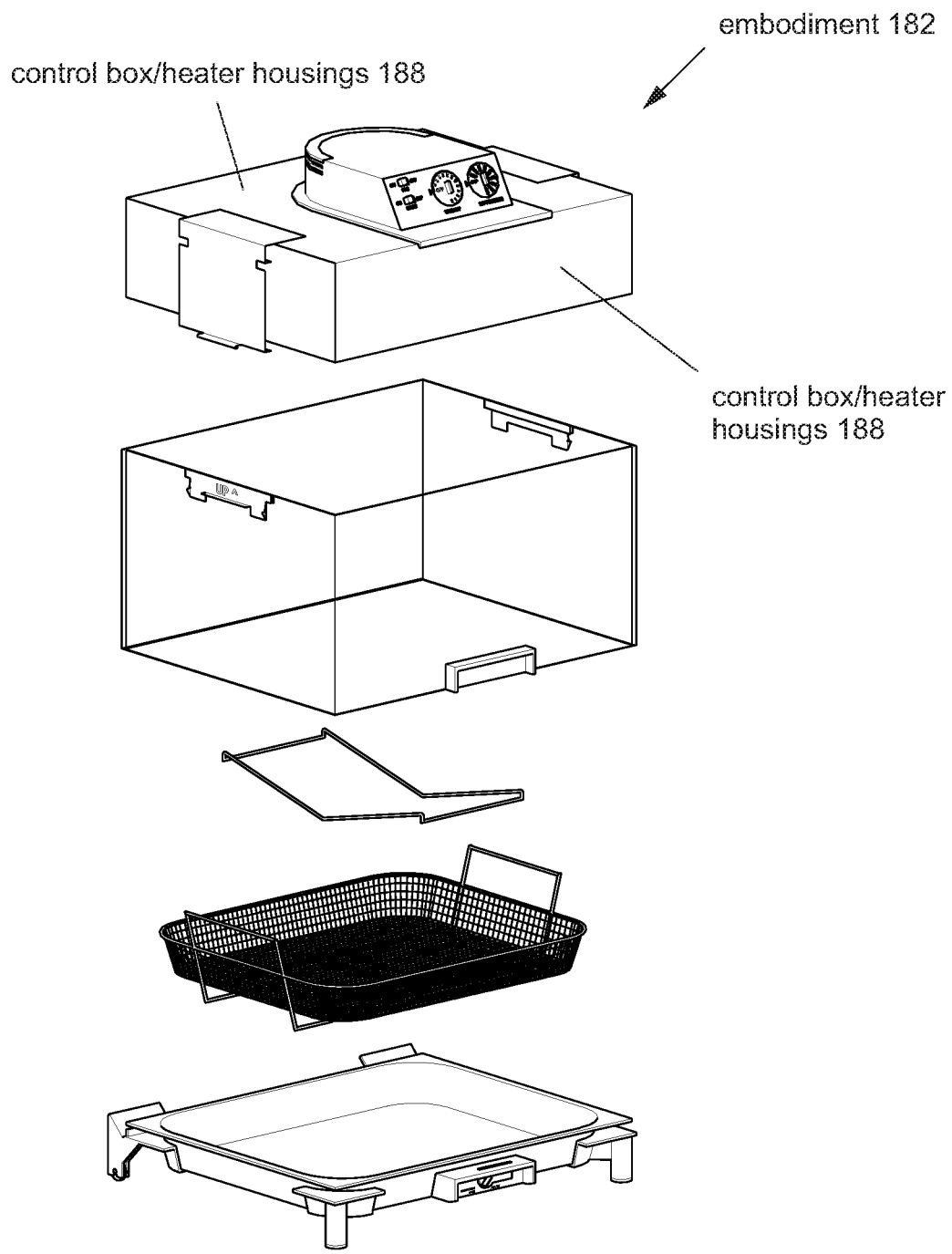
FIG. 46 is a forward, exploded, perspective view of embodiment 182.
Figure 47:
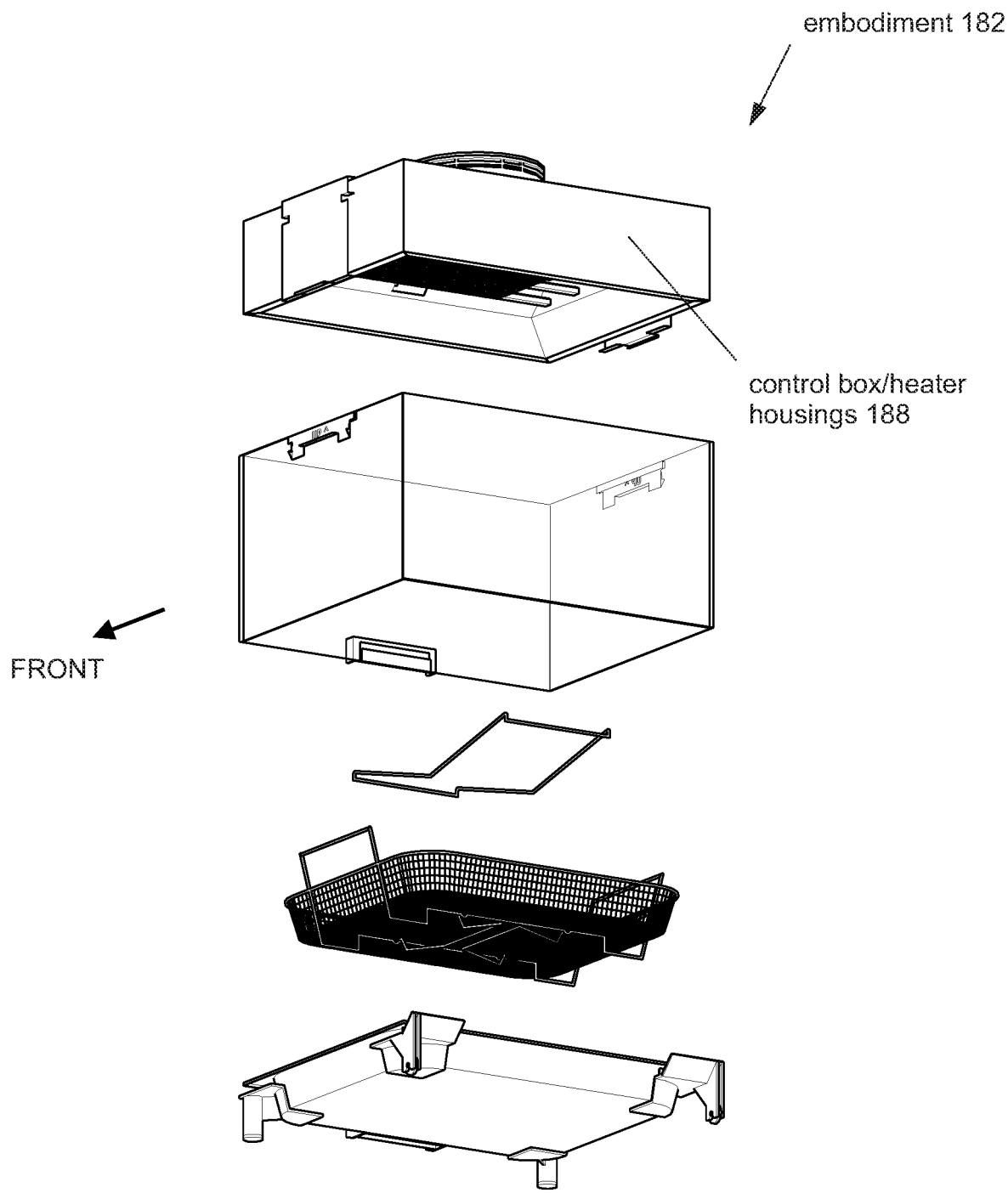
FIG. 47 is a rear and upward, exploded, perspective view of embodiment 182.
Figure 48:
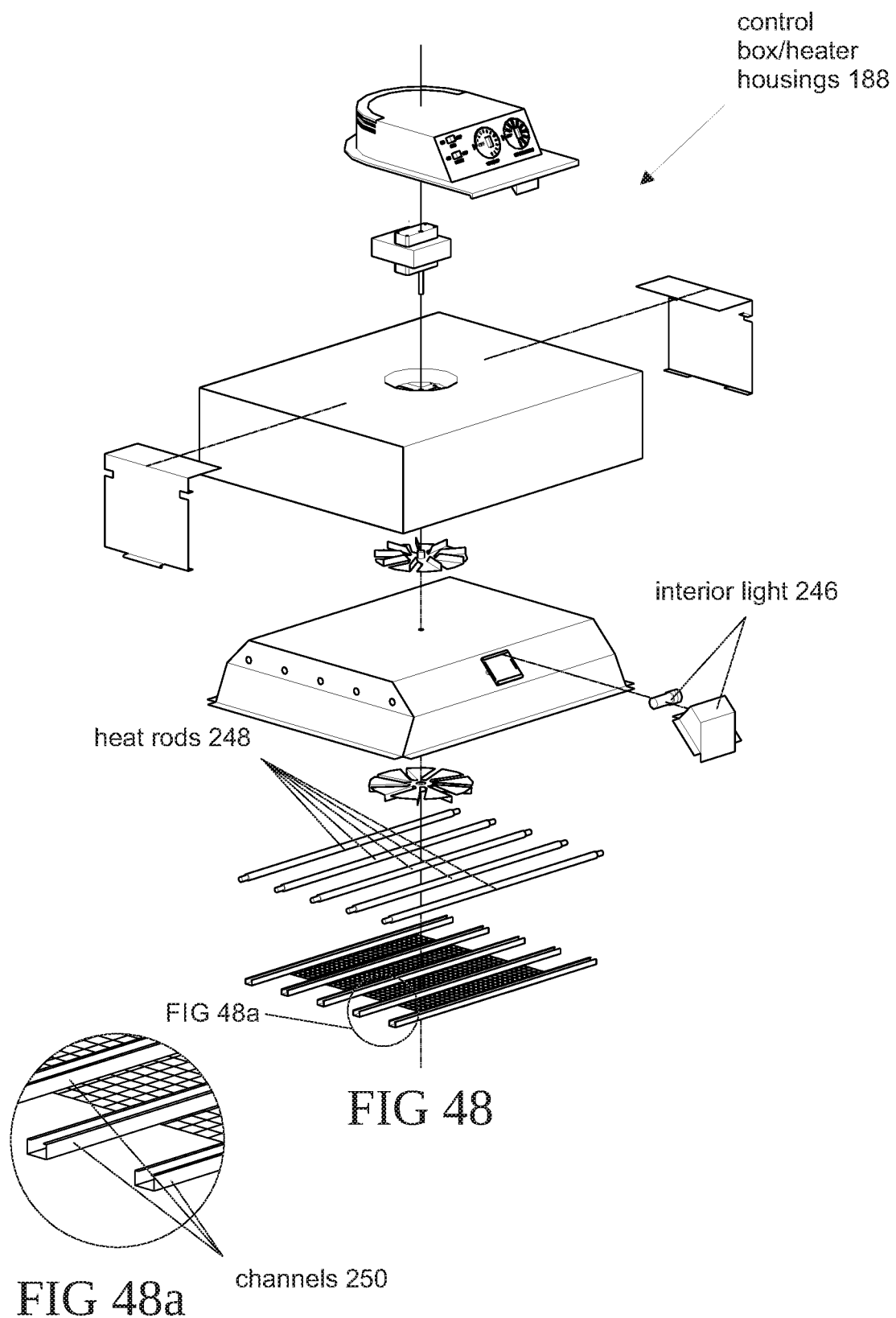
FIG. 48 is a forward, exploded, perspective view, of control box/heater housing 188 including: oven cavity light 246, heat rods 248, and channels 250, channels 250 producing results similar to heat baffle 158.

Lower vertical shaft end 176 penetrates the roof of reflector 144, mounting convection fan 172 below the roof of reflector 144, and above heat rods 148 (FIGS. 36 and 37).

Frustum conical detent 178 (FIGS. 8, 9, 36, and 37) is centrally formed upward from heat baffle 158, and, on narrower upper end 180, is open proximate to the central lower portion.

Screen 179 (FIG. 10) protects users from having contact with convection fan 172.

In operation, referring to at least FIG. 37, under the urging of convection fan 172, air within oven cavity 226 is drawn upward into frustum conical detent 178, and then into the lower central portion of radial convection fan 172. Output from convection fan 172 passes horizontally outward and then is deflected downward by reflector 144. From there, the downward deflected air circulates throughout oven cavity 226 and then reenters frustum conical detent 178 to repeat the cycle.

Heat from heat rods 148 enters into the airstream emanating from convection fan 172, and is circulated throughout the oven cavity.

Oven cavity 226, at user direction, may expand and contract in volume. FIG. 2 illustrates its contracted condition. FIG. 4 illustrates its expanded condition.

Embodiment 98's contracted condition (FIG. 2) provides fast warm-up, but at the expense of capacity. Embodiment 98's expanded condition (FIG. 4) provides greater capacity, but at the expense of slower warm-up.

Figure 29:
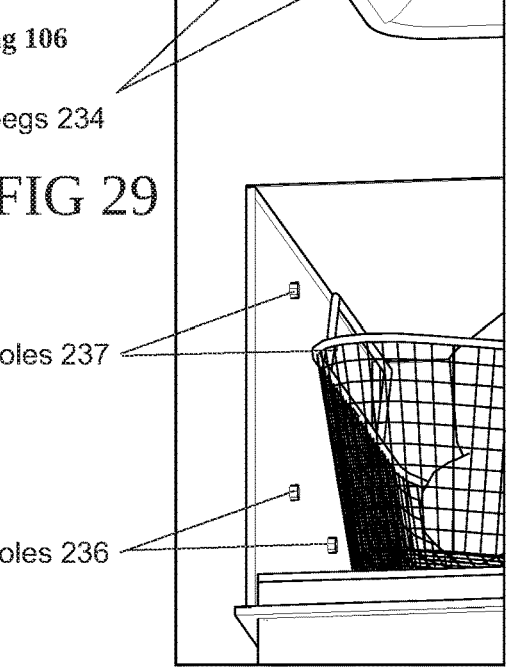
FIG. 29 is a detail of FIG. 26, as indicated in FIG. 26.
Figure 30:
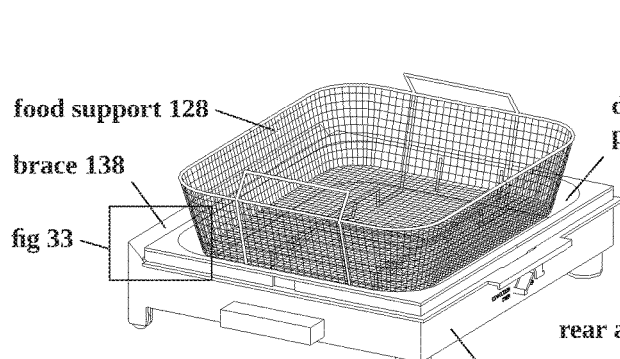
FIG. 30 is a frontal perspective view of supportive base 120, including food support 128 which rests within, and is supported by, drip pan 137, which in turn rests within, and is supported by, supportive base 120.
Figure 33:
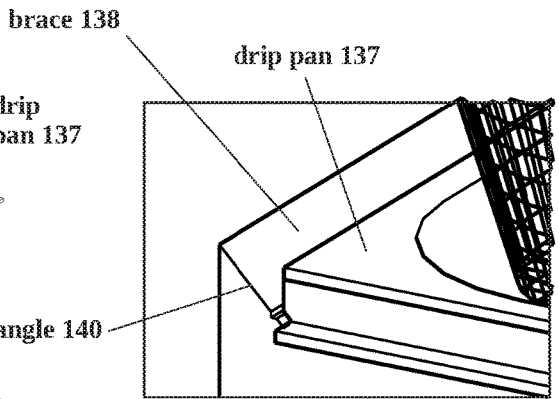
FIG. 33, are frontal perspectives showing brace 138 which supports transparent sidewalls 108 vertically, as shown in FIGS. 31 and 34; and supports transparent sidewalls 108 at a rear angle 140, as shown in FIGS. 30 through 35.
Figure 31:
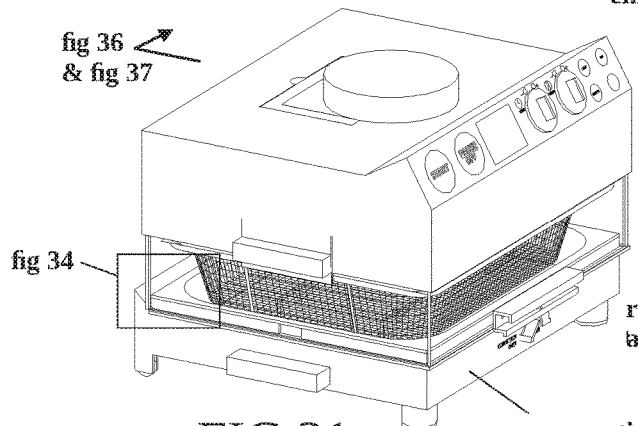
FIG. 31 is similar to FIG. 30 except that it includes sidewalls 108 and upper housing 106 and associated components.
Figure 34:
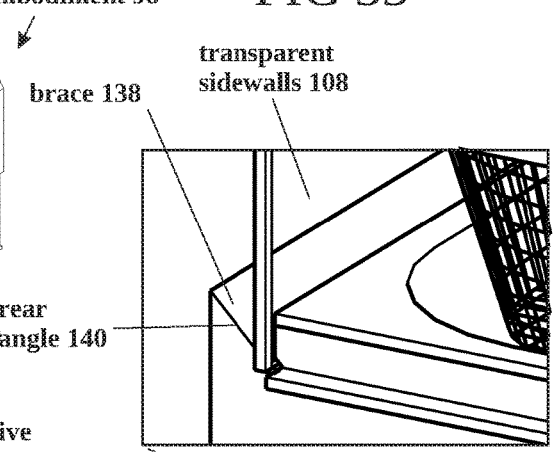
FIG. 34 is a detail of FIG. 31, as indicated in FIG. 31.
Figure 32:
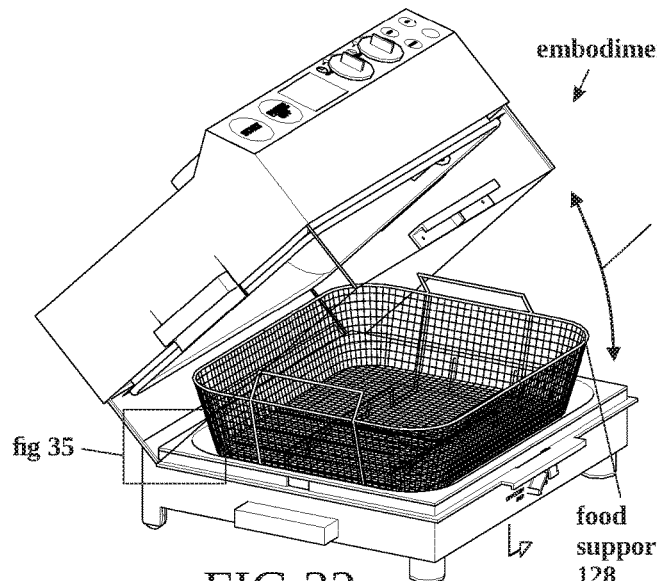
FIG. 32 is similar to FIG. 31, except that lid 104 is shown inclined at a rear angle 140.
Figure 35:
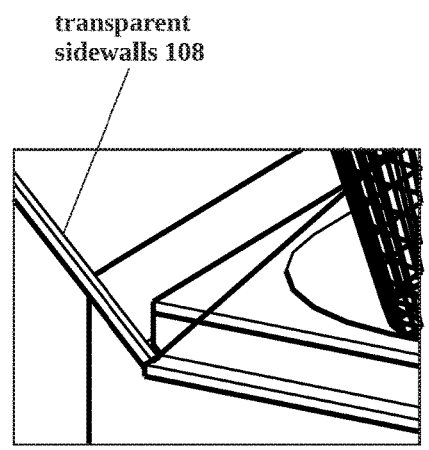
FIG. 35 is a detail of FIG. 32, as indicated in FIG. 32.

Referring at least to FIGS. 9, 10, and 24 through 29, transitioning between embodiment 98's contracted condition (FIG. 2) and its expanded condition (FIG. 4) only requires that the user pull outward 228 on handles 230 and 232 (FIG. 25), which causes pegs 234 disposed on the backs of handles 230 and 232, to disengage from holes 236 (FIG. 29).

Referring to at least FIGS. 9, 10, and 24-29, transitioning between embodiment 98's expanded condition (FIG. 4) to its contracted condition (FIG. 2) requires only that the user pull outward 228 on handles 230 and 232 (FIG. 25) which causes pegs 234 to disengage from holes 237.

Cooling fan 170 is rotated by motor 168 (FIGS. 10, 36, and 37), and is configured to blow cooling air over motor 168. Motor 168 also rotates convection fan 172 (FIGS. 10, 36, and 37).

Controls 166 display and regulate the operation of embodiment 98. This may include at least none, one, or more of the following: cooking time, cooking temperature, amount of air circulation, operation of lights, or other relevant items.

Figure 20:
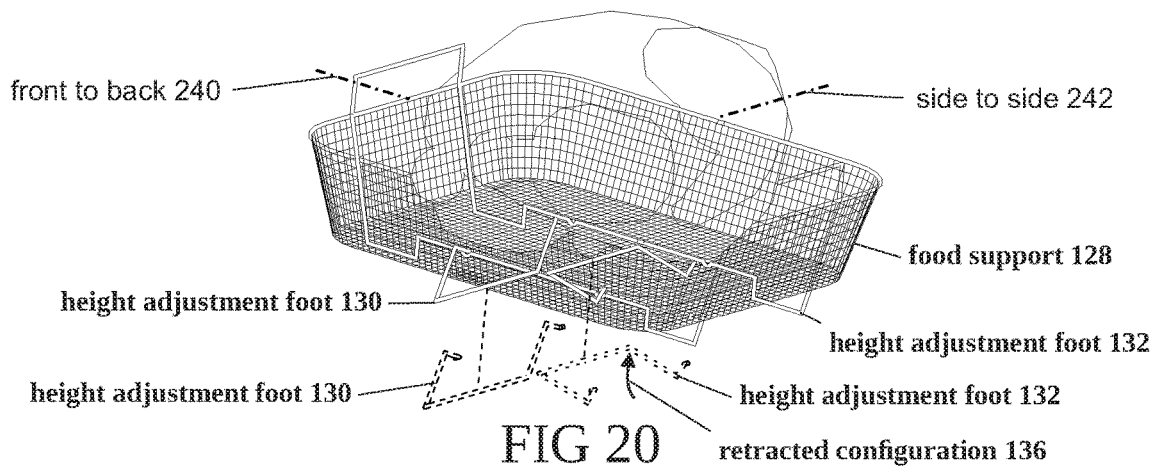
FIG. 20 is a lower frontal perspective of food support 128, including height adjustment foot 130 in extended configuration 134 (FIG. 22), and height adjustment foot 132 in its retracted configuration 136 (FIG. 20).

FIGS. 20-23 show food support 128 in various dispositions. FIG. 20 is a perspective taken from below and in front of food support 128 showing how height adjustment feet 130 and 132 are attached to food support 128.

As a non-limiting and non-exhaustive example, food support 128 is symmetrical front to back 240 and side to side 242.

Figure 23:
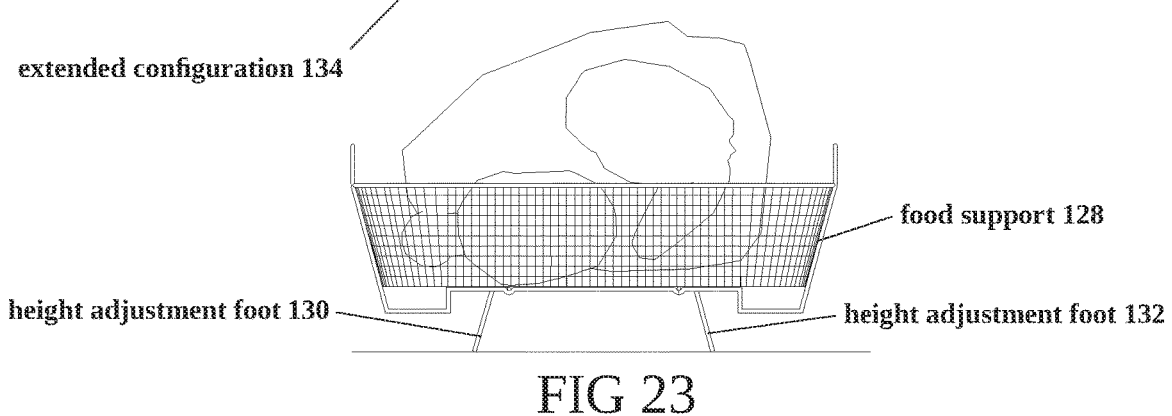
FIG. 23 is a frontal view of FIG. 20 with both height adjustment feet 130 and 132 in their extended configurations 134.
Figure 24:
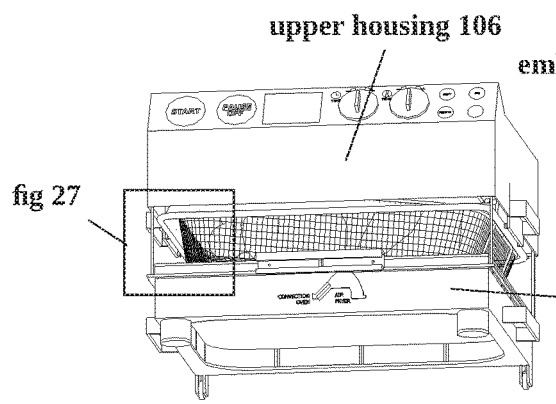
FIG. 24 is a lower frontal perspective of FIG. 2 showing the location of detail, FIG. 27.
Figure 27:
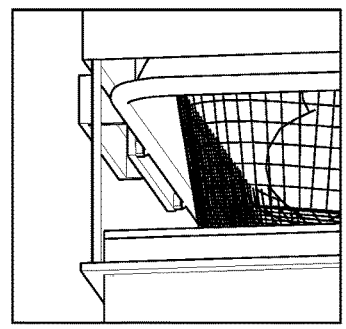
FIG. 27 is a detail of FIG. 24, as indicated in FIG. 24.
Figure 25:
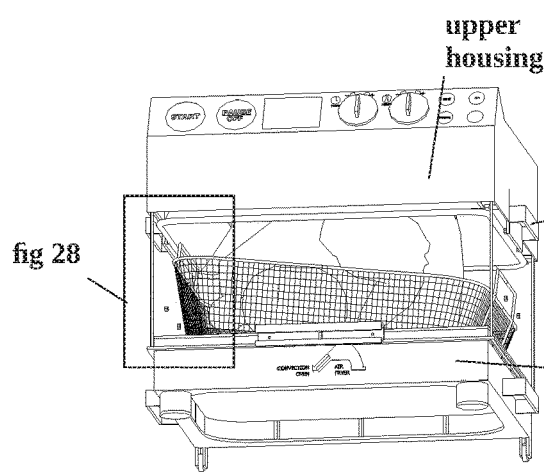
FIG. 25 is a lower frontal perspective of FIG. 4 showing the location of detail, FIG. 28.
Figure 28:
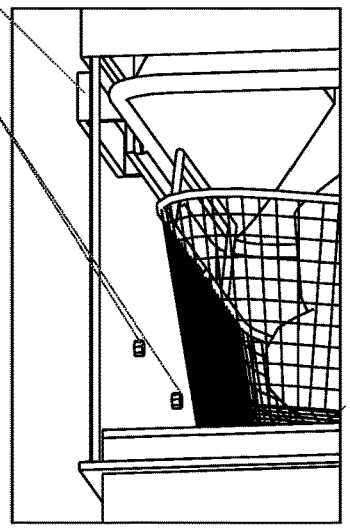
FIG. 28 is a detail of FIG. 25, as indicated in FIG. 25.
Figure 26:
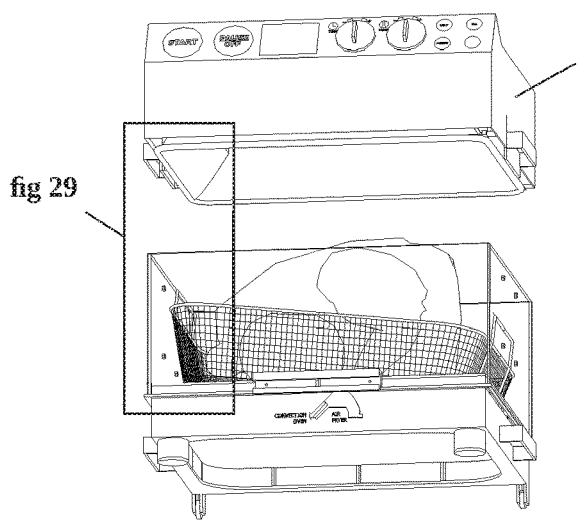
FIG. 26 is a lower frontal perspective of FIG. 4 with upper housing 106 removed from transparent sidewalls 108, and showing the location of detail, FIG. 29.

Height adjustment feet 130 and 132 can each be rotated 136 to an upper position (FIG. 21) and to a lower position (FIG. 23).

Figure 21:
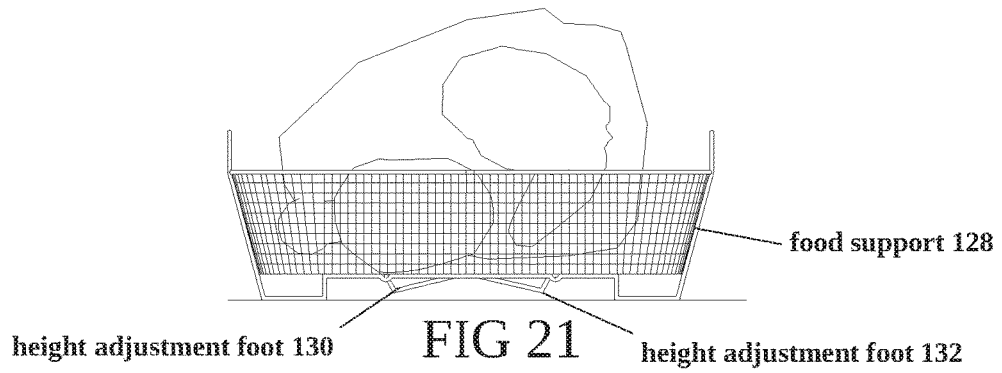
FIG. 21 is a frontal view of FIG. 20 with both height adjustment foot 130 and height adjustment foot 132 in their retracted configurations 136 (FIG. 20).

FIG. 21 illustrates when both height adjustment feet 130 and 132 are rotated to their upper position.

FIG. 23 illustrates when both height adjustment feet 130 and 132 are rotated to their lower position.

Figure 22:
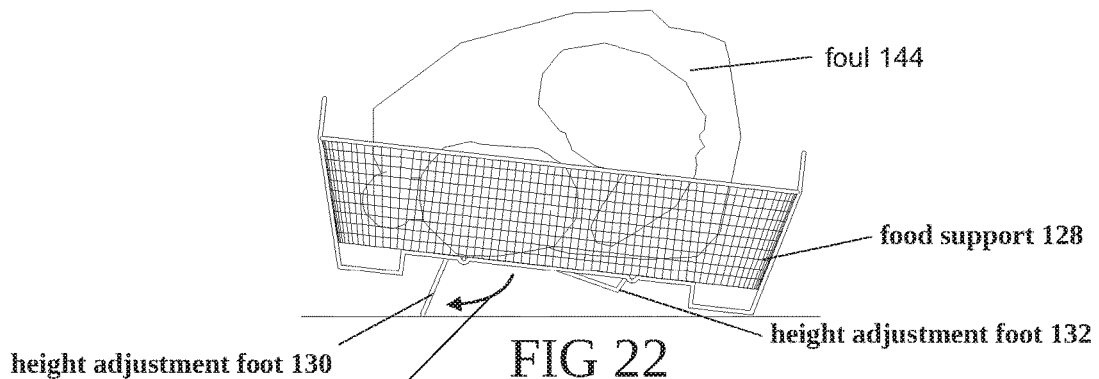
FIG. 22 is a frontal view of FIG. 20 with height adjustment foot 130 in its extended configuration 134, and height adjustment foot 132 in its retracted configuration 136 (FIG. 20).

FIG. 22 illustrates when height adjustment foot 130 is rotated to its lower position, and height adjustment foot 132 is rotated to its upper position, causing food support 128 to be inclined. This inclined disposition may be desirable to more evenly cook the backs of foul 144 (FIG. 22). It may also be desirable to let grease run off from steaks, or hamburgers, or fish, or other greasy foods, or it may be desirable for other uses.

As non-limiting and non-exhaustive examples, food support 128 may be advantageously used to support and cook a wide variety of foods, including, but not limited to: chicken, turkeys, ducks, steaks, hamburgers, French fries, chicken wings, toasted cheese sandwiches, leftovers, fried potatoes, etc.

FIG. 21 illustrates a disposition for food support 128 which may be advantageously used in at least cooking and storage.

FIG. 23 illustrates a disposition for food support 128 which may be used to bring food closer to a heat source to reduce cooking time, or to broil foods, or for other reasons.

Figure 59:
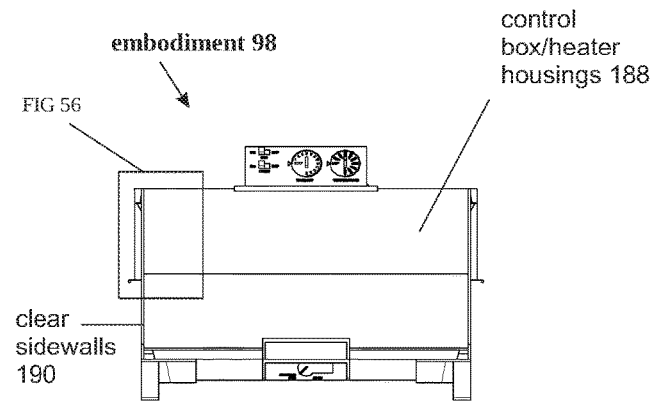
FIG. 59 is taken from the same viewpoint as FIG. 58, however, control box/heater housing 188 has been fully lowered into clear sidewalls 190 making oven cavity 184 minimized in volume.

FIGS. 52-59 demonstrate how assembly 200 can be raised and lowered between its upper position (FIG. 58) and its lower position (FIG. 59).

Referring at least to FIGS. 53-56, in its upper position (FIG. 58), bent over tabs 252 disposed at the bottom of support arms 256 rest on triangular support gussets 254 formed on the right and left edges of latching bracket 258. While so disposed, smaller triangular gussets 260 also engage bent over tabs 252, and upwardly contain movement of assembly 200 relative to clear sidewalls 190. This causes clear sidewalls 190 to be lifted simultaneously with assembly 200, when assembly 200 is lifted.

Lowering assembly 200 from upper position (FIG. 58) into clear sidewalls 192 to its lower position (FIG. 59), requires handles 262 to be pulled outward 264 (FIG. 53), and assembly 200 lowered to its lower position (FIG. 59), where smaller upper bent over tabs 266 rests on triangular support gussets 254 (FIGS. 56 and 59) and are upwardly contained by smaller triangular gussets 260. This again causes clear sidewalls 190 to be lifted simultaneously with assembly 200, when assembly 200 is lifted.

Referring at least to FIGS. 71-74, embodiment 210 has at least the following modes of operation:

FIG. 71 shows embodiment 210 with upper assembly 212 lowered 216 into sidewall 220, and door 292 open, which, as a non-limiting and non-exhaustive example, might facilitate loading food onto screen tray food support 294. As explained, this mode of operation provides minimum cooking times, as well as minimum capacity.

FIG. 72 shows embodiment 210 with upper assembly 212 raised 214 up inside of sidewall 220, and foul 244, including turkey support 294, placed inside of oven cavity 226. This mode of operation maximizes oven capacity, while lengthening food cooking time. This mode of operation allows easy insertion of food, including large food articles, into oven cavity 226.

FIG. 73 shows embodiment 210 with upper assembly 212 removed from coupling with sidewall 220. This mode of operation provides even easier than FIG. 72's, insertion of food articles into oven cavity 236.

FIG. 74 shows embodiment 210 with upper assembly 212, and sidewall 220, and door 292 removed from supportive base 222. This mode of operation offers the easiest insertion of food into oven cavity 236.

FIGS. 77 through 79 show embodiment 296. Embodiment 296 includes oven enclosure 298 which envelops oven cavity 300. Oven cavity 300 may have an expanded oven cavity volume by placing drip pan 302 directly on top of enclosure floor 304 (FIGS. 77 and 79).

Oven cavity 300 may have a reduced oven cavity volume by placing drip pan 302 higher 303 in oven cavity 300 by supporting it on drip pan rail supports 306. In this higher disposition (FIG. 78), drip pan 302 fully divides oven cavity 300, resulting in lower oven cavity 308 being fully separated from upper oven cavity 310.

Heat rods 312, disposed in the upper portion of oven cavity 300 (FIG. 79) provide cooking heat to oven cavity 300 either when oven cavity 300 is expanded (FIGS. 77 and 79), or when it is reduced (FIG. 78).

In its expanded condition (FIGS. 77 and 79) oven cavity 300 is configured to hold large foods 314, such as, as non-limiting and non-exhaustive examples, a turkey, or a large pot roast.

In its reduced condition (FIG. 78), oven cavity 300 may quickly cook smaller foods 314, such as, as non-limiting and non-exhaustive examples, chicken wings, or french fries, or hotdogs, or toast.

Door 316 is configured to be disposed in closed position (FIG. 79), or in an open disposition (FIGS. 77 and 78). In its open disposition, door 316 has been rotated down 322 and slid 324 beneath enclosure floor 304 (FIG. 79). This is facilitated by door 316 having opposing, horizontally outward projecting, rods which extend from the bottom edge of door 316, which engage horizontal rails contained enclosure supports 326.

When door 316 is in its closed disposition (FIG. 79), due to its incline disposition, door 316 is held closed by gravity.

As a non-limiting and non-exhaustive alternative examples, door 316 might be hinged to swing open horizontally (FIG. 71-74), or swung upward, or slid sideways or upward, or opened in other useful manners.

What is claimed is:

1. A cooking enclosure configured to hold food being cooked, and the enclosure including:
    a surrounding, generally vertical, sidewall, projecting upward from a base, the base including a floor bridging the bottom of enclosure, and the enclosure being capped by a vertically moving ceiling, configured to fixedly couple in at least two different positions above the base,
    the vertically moving ceiling mounting a cooking heat source which is in communication with the enclosure's interior, and the vertically moving ceiling being configured to move up and down within the sidewall, and to thereby vary, up and down, the volume of the cooking enclosure,
    wherein the cooking enclosure is configured to have both a smaller cooking enclosure volume, suitable for quickly cooking small foods, and is configured to have a larger cooking enclosure volume necessary to cook larger foods.

2. The enclosure of claim 1, wherein the sidewall includes a hinged door configured to allow food articles to be placed within the enclosure.

3. The enclosure of claim 2, wherein the hinged door is configured to be both fully closed, and to be partially open, causing a gap between one end of the door and the sidewall, causing venting outside air into the enclosure wherein the outside air displaces moist interior air, thus helping crisp foods being cooked within the enclosure.

4. The enclosure of claim 1, wherein the sidewall includes at least one transparent panel.

5. The enclosure of claim 4, wherein the sidewall is comprised of a plurality of generally planar transparent panels.

6. The enclosure of claim 1, wherein the vertically moving ceiling mounts controls configured to regulate the cooking heat source.

7. The enclosure of claim 1, wherein the base includes one or more front supports, and one or more rear supports; and a plurality of front to back tracking, wheels mounted to at least one rear support, wherein, the enclosure is configured to move forward and backward, in a linear path, via the wheels, on a countertop, or other support surface, for ease-of-use, or for other purposes.

8. The enclosure of claim 1, wherein the sidewall has an upper perimeter edge, and further comprising an arm extending outward from the vertically moving ceiling over the upper perimeter edge, the arm is configured to vertically couple, within the sidewall, the vertically moving ceiling in at least two different positions above the base.

9. The enclosure of claim 1, wherein the vertically moving ceiling mounts a motor, including a coupled fan, and the motor and coupled fan being configured to move, within the enclosure, air heated by the heat source, such that faster cooking is achieved by the fan driven hot air movement.

10. The enclosure of claim 1, wherein the sidewall has a lower perimeter edge, including a portion of the lower perimeter edge being hinged to the base, and the hinged portion configured to allow vertical tilting of the sidewall to an open disposition which permits food, or other articles, to be inserted into the enclosure.

11. The enclosure of claim 10, wherein the sidewall is held in its tilted open disposition by gravity.

12. The enclosure of claim 10, wherein the sidewall is configured to be fully closed against the base, and is configured to be tilted and held in a partially open disposition which allows venting of outside air into the enclosure, such venting facilitates crisping of foods being cooked within the enclosure by introducing outside dry air into enclosure which replaces moist air within the enclosure.

13. The enclosure of claim 1, wherein the sidewall is configured to be completely removed from the base.

14. The enclosure of claim 1, wherein the vertically moving ceiling is configured to be completely removed from the sidewall, to facilitate insertion of foods into the enclosure.

* * * * *